US011855314B2

(12) United States Patent
Wenzel et al.

(10) Patent No.: US 11,855,314 B2
(45) Date of Patent: Dec. 26, 2023

(54) ELECTROCHEMICAL ARRANGEMENT AND ELECTROCHEMICAL SYSTEM

(71) Applicant: REINZ-DICHTUNGS-GMBH, Neu-Ulm (DE)

(72) Inventors: Stephan Wenzel, Pfaffenhofen (DE); Bernd Gaugler, Ulm (DE); Armin Guetermann, Leipheim (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 875 days.

(21) Appl. No.: 16/755,851

(22) PCT Filed: Oct. 15, 2018

(86) PCT No.: PCT/EP2018/078075
§ 371 (c)(1),
(2) Date: Apr. 13, 2020

(87) PCT Pub. No.: WO2019/076813
PCT Pub. Date: Apr. 25, 2019

(65) Prior Publication Data
US 2021/0202963 A1    Jul. 1, 2021

(30) Foreign Application Priority Data

Oct. 16, 2017   (DE) ...................... 20 2017 106 262.7
Mar. 6, 2018    (DE) ...................... 20 2018 101 235.5

(51) Int. Cl.
*H01M 50/289*   (2021.01)
*H01M 8/0273*   (2016.01)
(Continued)

(52) U.S. Cl.
CPC ............. *H01M 8/0273* (2013.01); *C25B 9/75* (2021.01); *C25B 11/036* (2021.01);
(Continued)

(58) Field of Classification Search
CPC .......... H01M 50/289; H01M 10/0468; H01M 8/0273; H01M 8/2483; H01M 8/0206;
(Continued)

(56) References Cited

U.S. PATENT DOCUMENTS

2005/0153192 A1* 7/2005 Nakagawa ............ H01M 8/241
429/432
2015/0140466 A1* 5/2015 Kageyama ............ H01M 8/241
429/463

FOREIGN PATENT DOCUMENTS

CN    105304851 A    2/2016
CN    106463738 A    2/2017
(Continued)

OTHER PUBLICATIONS

ISA European Patent Office, International Search Report Issued in Application No. PCT/EP2018/078075, dated Feb. 1, 2019, Germany, 4 pages.
(Continued)

*Primary Examiner* — Zulmariam Mendez
(74) *Attorney, Agent, or Firm* — McCoy Russell LLP

(57) ABSTRACT

An electrochemical arrangement with two metallic separator plates which each define a plate plane and which are stacked in a stack direction perpendicular to the plate planes. The separator plates comprise sealing elements which are embossed into the separator plate and which are supported against one another for sealing the electrochemical cell which is arranged between the separator plates and which are reversibly deformable in the stack direction up to a distance z2. The arrangement further comprises at least one support element which is arranged between the separator plates and which is distanced to the sealing elements of the separator plates in a direction parallel to the plate planes.

20 Claims, 15 Drawing Sheets

(51) Int. Cl.
- *H01M 8/2483* (2016.01)
- *C25B 9/75* (2021.01)
- *C25B 11/036* (2021.01)
- *H01M 8/0206* (2016.01)
- *H01M 8/028* (2016.01)
- *H01M 8/242* (2016.01)
- *H01M 8/248* (2016.01)

(52) U.S. Cl.
CPC ......... *H01M 8/0206* (2013.01); *H01M 8/028* (2013.01); *H01M 8/242* (2013.01); *H01M 8/248* (2013.01); *H01M 8/2483* (2016.02)

(58) Field of Classification Search
CPC ...... H01M 8/028; H01M 8/242; H01M 8/248; C25B 9/75; C25B 11/036
See application file for complete search history.

(56) References Cited

FOREIGN PATENT DOCUMENTS

| | | | |
|---|---|---|---|
| DE | 102009016263 A1 | 11/2009 |
| DE | 102012214268 A1 | 2/2013 |
| DE | 102013216544 A1 | 3/2014 |
| DE | 102014221351 A1 | 4/2016 |
| EP | 2937923 A1 | 10/2015 |
| EP | 2958175 A1 | 12/2015 |
| JP | 2005203159 A | 7/2005 |
| JP | 2007009937 A | 1/2007 |
| JP | 2009230876 A | 10/2009 |
| JP | 2010272474 A | 12/2010 |
| JP | 2015088293 A | 5/2015 |
| JP | 2016004739 A | 1/2016 |
| JP | 2017139218 A | 8/2017 |
| WO | 2014174944 A1 | 10/2014 |
| WO | 2016055510 A1 | 4/2016 |

OTHER PUBLICATIONS

Japanese Patent Office, Office Action Issued Application No. 2020-520031, dated May 10, 2022, 8 pages.
China National Intellectual Property Administration, Office Action and Search Report Issued in Application No. 201880067434.X, dated Dec. 2, 2022, 16 pages.

* cited by examiner

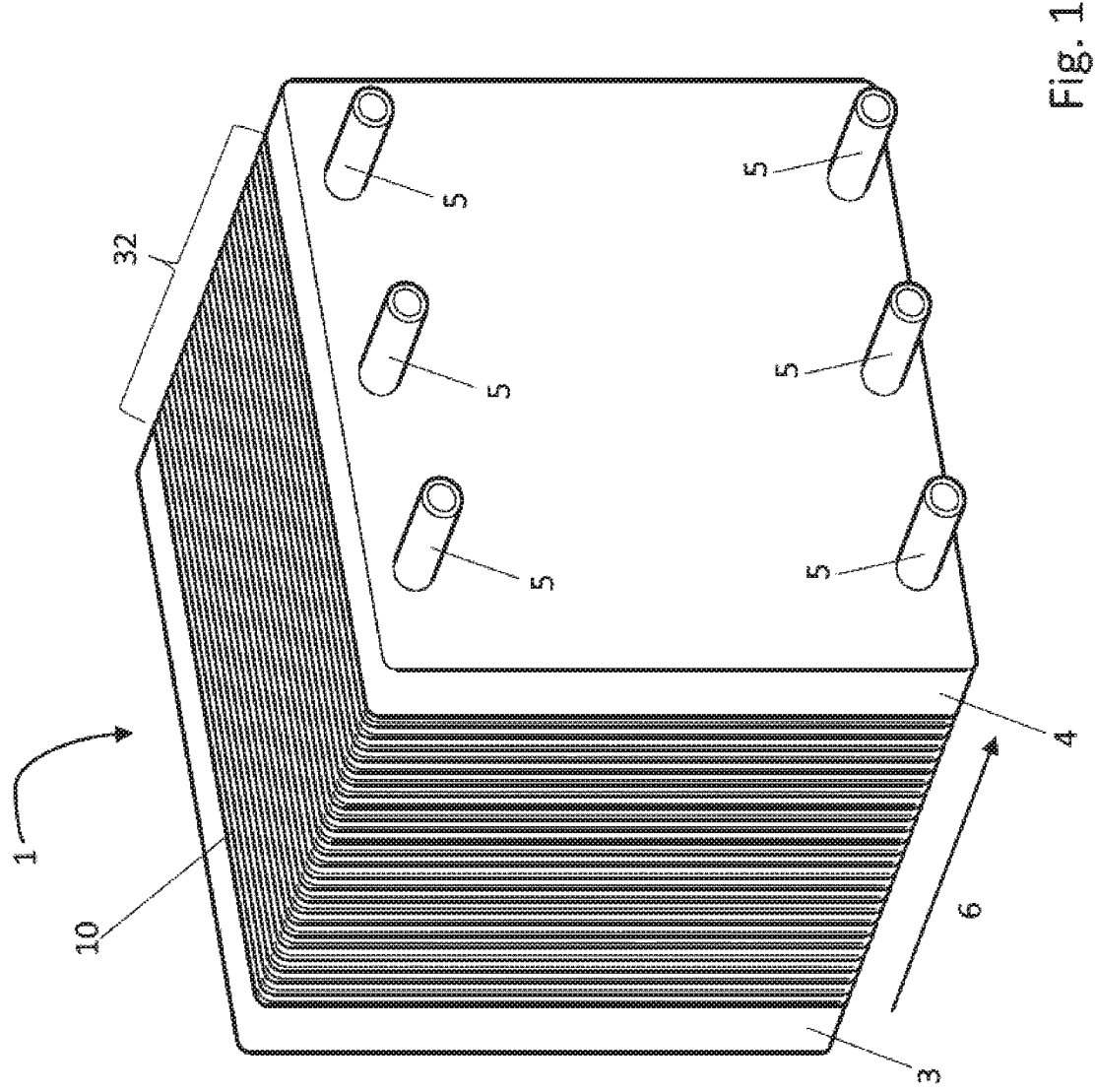
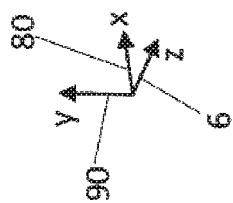
Fig. 1

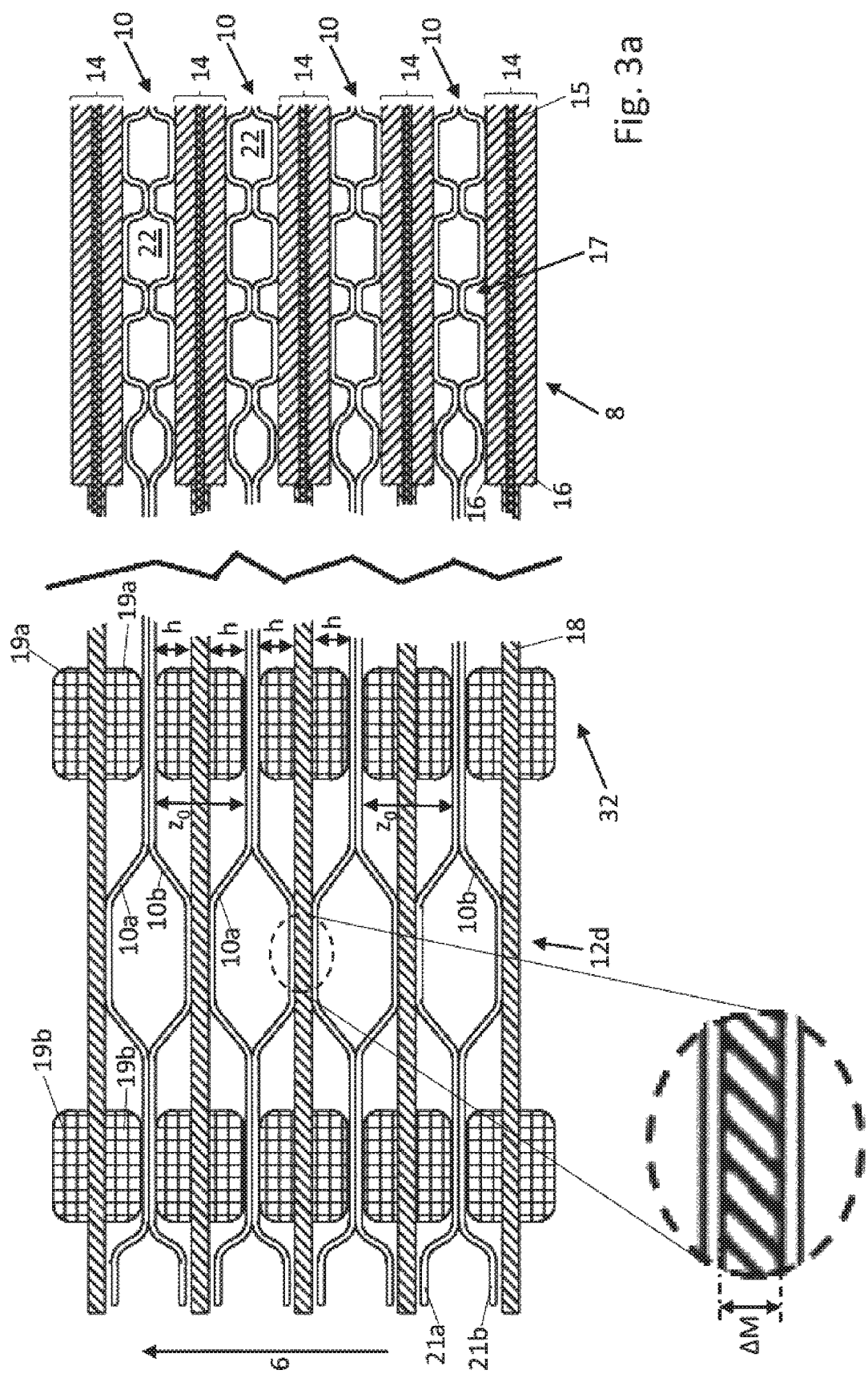

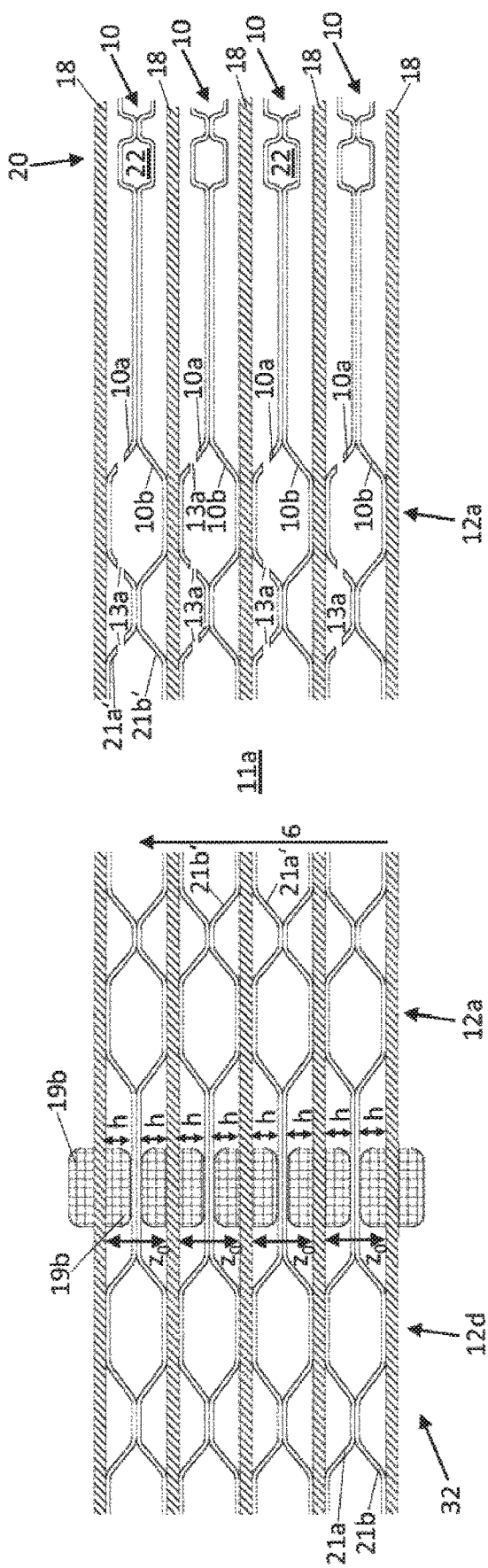

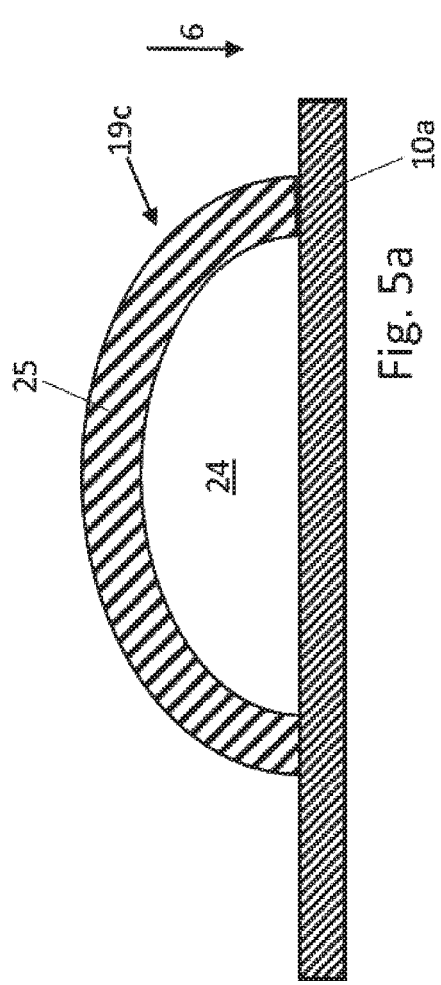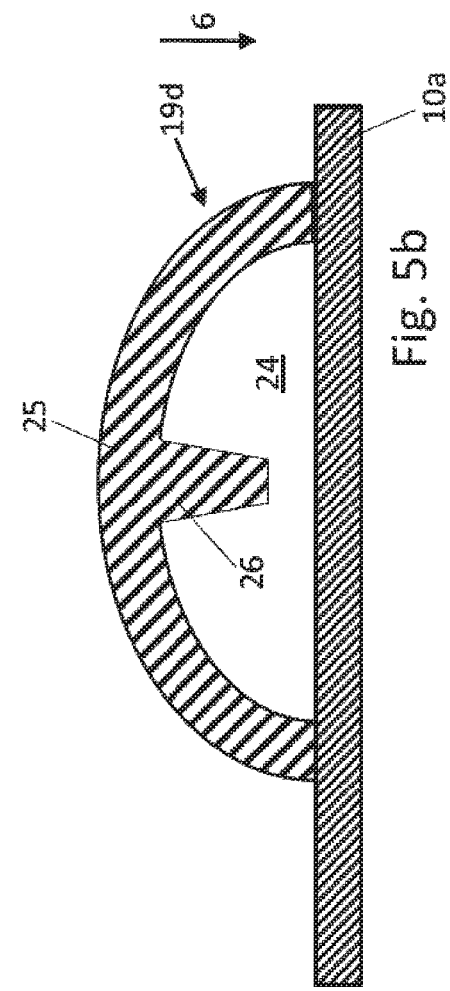

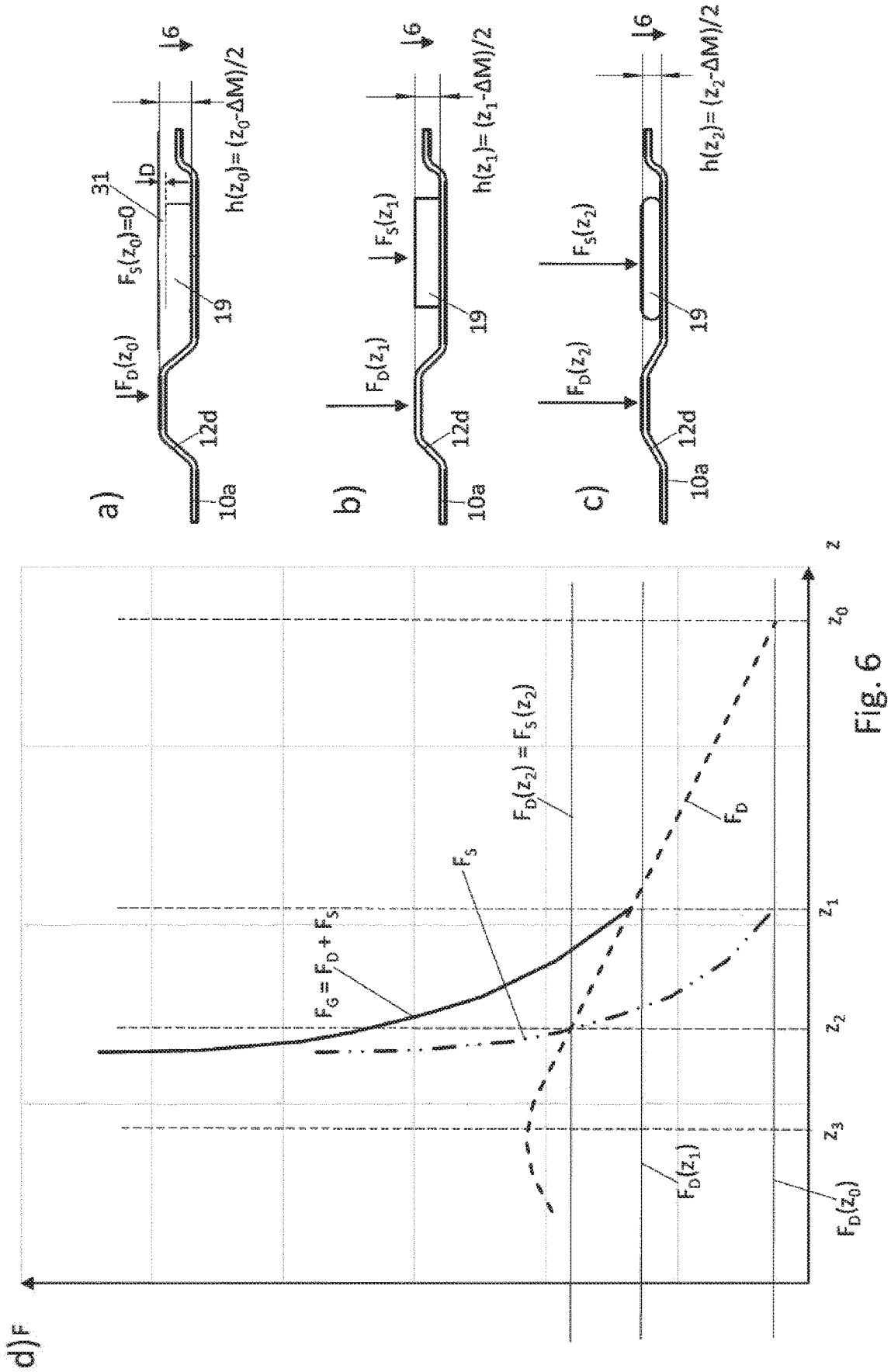

ELECTROCHEMICAL ARRANGEMENT AND ELECTROCHEMICAL SYSTEM

CROSS-REFERENCE TO RELATED APPLICATIONS

The present application is a U.S. National Phase of International Patent Application Serial No. PCT/EP2018/078075 entitled "ELECTROCHEMICAL ARRANGEMENT AND ELECTROCHEMICAL SYSTEM," filed on Oct. 15, 2018. International Patent Application Serial No. PCT/EP2018/078075 claims priority to German Patent Application No. 20 2017 106 262.7 filed on Oct. 16, 2017 and German Patent Application No. 20 2018 101 235.5 filed on Mar. 6, 2018. The entire contents of each of the above-referenced applications are hereby incorporated by reference for all purposes.

The invention relates to an electrochemical arrangement with two metallic separator plates and an electrochemical cell which is arranged between the metallic separator plates. The invention further relates to an electrochemical system with a multitude of such electrochemical arrangements which are arranged in a stack.

BACKGROUND AND SUMMARY

Known electrochemical systems usually comprise a stack of electrochemical cells which are each separated from one another by way of separator plates. The term electrochemical cell within the framework of this document in particular is to include cells for converting chemical energy into electrical energy (e.g. fuel cells), for inducing a chemical reaction by way of feeding electrical energy (i.e. electrolysis cells) or for the exchange of moisture between gases (i.e. humidifier cells).

Typically, the separator plates are formed from two joined-together individual plates. The individual plates of the separator plate can be materially joined together, e.g. by way of one or more weld connections, in particular by way of one or more laser weld connections. Furthermore, the separator plates usually comprise at least one or more through-openings. The media and/or the reaction products can be led to the electrochemical cells which are arranged between adjacent separator plates of the stack or into the interior which is formed by the individual plates of the separator plate or be led away from the cells or out of the interior, through the through-openings.

The mentioned separator plates can serve e.g. for the electrical contacting of the electrodes of the individual electrochemical cells (e.g. fuel cells) and/or for the electrical connection of adjacent cells (series connection of the cells). The separator plates which in particular can be constructed of two individual plates, and indeed these individual plates can each comprise or form structures which are designed e.g. for the supply of the electrochemical cells which are arranged between adjacent separator plates, with one or more media and/or for the away-transport of reaction products. The media can be fuels (e.g. hydrogen or methanol) or reaction gases (e.g. air or oxygen). Furthermore, the separator plates or the individual plates can comprise structures for leading the coolant through the separator plate, in particular for leading a coolant through an interior which is enclosed by the individual plates of the separator plate. The separator plates can therefore be designed for the onward-leading of the waste heat which arises in the electrochemical cell on converting electrical or chemical energy. Likewise, the separator plates can be designed for sealing the different media channels or cooling channels to one another, and/or the complete separator plate to the outside.

The electrochemical cells typically moreover comprise one or more electrolyte membranes (e.g. in the case of fuel cells) or one or more heat exchanger membranes (e.g. in the case of humidifier cells). Apart from the membrane, the electrochemical cells can further comprise gas diffusion layers which are preferably arranged on both sides of the membrane and which can improve the rate of a media transfer or of a media exchange via the membrane. The gas diffusion layers can be designed e.g. as a metal non-woven or carbon non-woven.

For sealing the electrochemical cells and/or for sealing the media channels which are formed by the through-openings in the separator plates, with respect to the surroundings or with respect to other regions of the respective electrochemical system, the separator plates or the individual plates of the separator plates often comprise sealing elements which are shaped or embossed (stamped) into the separator plates e.g. in the form of sealing beads. In particular, these can be designed as arched full beads or full beads with two limbs and with a roof which extends therebetween. The sealing elements of adjacent separator plates of the stack are typically supported on one another for achieving the sealing effect. Herein, e.g. an edge region of the electrolyte membrane or of the humidifier membrane of the electrochemical cell can be received between the sealing elements of the adjacent separator plates which are supported on one another.

In order for the sealing elements to be able to achieve a good sealing effect which is constant independently of the respective predominant operating state, it is desirable for in particular the sealing elements to be elastically, i.e. reversibly deformable at least within a predefined tolerance region. However, if the sealing elements are deformed beyond the tolerance region, then plastic, i.e. irreversible deformations of the sealing elements can occur. This can possibly lead to the sealing elements no longer being able to fulfil their sealing effect. By way of this, the efficiency of the system can be considerable reduced or a maintenance of the operation of the system even becomes completely impossible. If the system is operated with highly flammable media or if such media are produced on operation, then damage to the sealing elements can even represent a huge safety risk. An irreversible deformation of the sealing elements of the separator plates can be caused e.g. by way of the sudden action of large mechanical forces upon the plate stack, as can occur for example in the event of a car accident. It is therefore advantageous to provide the system with a protection mechanism which protects the sealing elements as much as possible from irreversible plastic deformations even given the action of large mechanical forces.

One known solution envisages enclosing the electrochemical system in a protective container which has a high strength and a good mechanical stability. However, in the case of an impact, such a large impulse transmission can occur that this cannot be accommodated and/or dissipated by the protective container, so that it is transmitted onto the plate stack in an undamped manner.

Other known solutions envisage electronic cut-off mechanisms which however only interrupt the flow of media, but offer no projection whatsoever from mechanical destruction.

It is therefore the object of the invention to provide an electrochemical arrangement with two separator plates and with an electrochemical cell which is arranged between the separator plates and which is sealed off by sealing elements, said arrangement being able to withstand as large as possible mechanical loads and hence a safe as possible operation. The spatial requirement and the weight of the intended arrangement should herein hardly increase at all compared to the known solutions. Furthermore, an electrochemical system with a multitude of respective electrochemical arrangements is to be provided.

This object is achieved by an electrochemical arrangement according to claim 1 and by an electrochemical system which comprises a multitude of such electrochemical arrangements.

The electrochemical arrangement which is put forward here comprises at least:
 a first and a second metallic separator plate which each define a plate plane and which are stacked in a stack direction perpendicularly to the plate planes; and
 an electrochemical cell which is arranged between the separator plates.

The separator plates each comprise at least one sealing element which is embossed into the separator plate and which rises above the respective plate plane, wherein the sealing elements of the separator plates are supported against one another for sealing at least the electrochemical cell which is arranged between the separator plates. The sealing elements of the separator plates are elastically deformable in the stack direction, so that a distance z of the plate planes of the separator plates to one another is reversibly reducible at least to a distance $z_2$ by way of an elastic compression of at least one of the sealing elements of the separator plates.

Furthermore, the electrochemical system which is put forward here comprises at least one support element which is arranged between the separator plates and which is distanced to the sealing elements of the separator plates in a direction parallel to the plate planes of the separator plates. If the sealing elements are designed as full beads, then the sealing element comprises the complete full bead. A support element is therefore distanced to the entire sealing element and not between the two bead limbs of a full bead.

The design of the sealing elements of the separator plates and the arrangement and the design of the at least one support element for the protection of the sealing elements of the separator plates from an irreversible plastic deformation are such that when the distance z of the plate planes of the separator plates to one another is reduced to a distance z of $z \le z_2$ as a result of a pressing force which acts upon the separator plates in the stack direction, a force $F_S$ which is required for compressing or for the further compressing of only the at least one support element by a displacement $\Delta z'$ in the stack direction is larger than a force $F_D$ which is required for the further compressing of only the at least one sealing element of the separator plates by the displacement $\Delta z'$ in the stack direction.

The separators plate as a whole can each be shaped from a plane metal sheet, e.g. by way of an embossing or deep-drawing process. If the separator plates consist of more than one plate, then the individual plates can each be shaped from a plane metal sheet, likewise for example by way of an embossing or deep-drawing process. The plate planes can then be defined e.g. by those regions of the separator plates which have remained plane which have not been deformed by the shaping process. Instead of speaking of the distance z of the plate planes of the separator plates to one another, hereinafter for the sake of simplicity one also speaks of the distance z of the separator plates to one another or simply of the plate distance. If a separator plate consists of more than one plate, then the plate plane of the separator plate is defined as the middle plane of the plate group.

The design of the sealing elements of the separator plates and the arrangement and design of the at least one support element can be such that for distances z of the separator plates to one another of $z \le z_1$, wherein $z_1 > z_2$, given a further reduction of the distance z of the separator plates to one another, the force $F_S$ which is required for compressing or for the further compressing of only the support element by a displacement $\Delta z'$ in the stack direction grows more rapidly than the force $F_D$ which is required for the further compression of only the sealing element by the displacement $\Delta z'''$ in the stack direction. Preferably, this applies to all distances z of the separator plates of $z \le z_1$.

The at least one support element can be arranged and designed such that the support element has an essentially exponential force-displacement curve for distances z of the separator plates to one another of $z \le z_1$ with $z_1 > z_2$. Herein, the force-displacement curve represents the force $F_S(z)$ which must be mustered in order to compress only the support element which is arranged between the separator plates, to the extent that the distance of the separator plates to one another is equal to z. This can be the case at least in sections in the region $z \le z_1$. However, this is preferably the case throughout the complete range $z \le z_1$.

The sealing elements of the separator plates can be designed in a manner such that a reduction of the distance of the separator plates to one another to a value $z \le z_3$ with $z_3 < z_2$ effects an irreversible plastic compression with regard to at least one of the sealing elements of the separator plates, preferably with regard to the sealing elements of both separator plates.

One or more of the support elements of the at least one support element can be designed in a manner such that it/they each comprises/comprise at least one cavity and/or a multitude of pores. E.g. one or more of the support elements of the at least one support element can each comprise a foamed material or be formed completely or partly of a foamed material. Layer constructions with different elastically compressible and/or foamed materials are possible, wherein the layers preferably extent parallel to the plate plane of the adjacent separator plate. The support element or the support elements which comprises/comprise the at least one cavity and/or the pores can herein each be designed in a manner such that the at least one cavity and/or the pores is/are completely or at least partly collapsible by way of a pressing force which acts upon the separator plates in the stack direction. E.g. the support element which comprises the at least one cavity and/or the pores can then each be designed and arranged in a manner such that the at least one cavity and/or the pores is/are each maximally collapsed given a distance z of the separator plates to one another of $z \le z_2$.

If the cavity or the pores are collapsed to the maximum, then the resistance of the support element to a further compressing in the stack direction is usually determined by the strength or the elasticity of the material or the materials, from which the support element or support elements are formed. In contrast, the at least one support element can further be designed in a manner such that its resistance to a compressing or to a further compressing in the stack direction when the cavity and/or the pores are not or only partly collapsed e.g. for plate distances z of $z > z_2$ is predominantly not determined by the strength or the elasticity of the support element material, but by the geometry of the cavity and/or of the pores of the support element or possibly by a pressure of a gas which is enclosed in the cavity and/or in the pores. In this manner, the resistance of the at least one support element to a compressing or to a further compressing in the stack direction can made dependent on the plate distance in a targeted manner by way of the design of the at least one support element with a cavity and/or with pores.

E.g. the design of the sealing elements of the separator plates and the arrangement and design of the at least one support element can be such that for plate distances z of $z>z_2$, the force $F_D$ which is necessary for compressing or for the further compressing of only the at least one sealing element of the separator plates by a displacement $\Delta z''$ in the stack direction is larger or equal to the force $F_S$ which is required for the compressing or for the further compressing of only the at least one support element by the displacement $\Delta z''$ in the stack direction. Preferably, this applies at least to plate distances z with $z_1<z<z_0$.

In other words, the resistance of the at least one sealing element to a compressing or to a further compressing of the sealing element in the stack direction can be so low for large plate distances, specifically plate distances z of $z>z_1$, that the resistance of the complete arrangement to a reduction of the plate distance in this region is dominated by the sealing elements of the separator plates. This then means that the at least one support element does not or possibly only slightly increases the resistance of the arrangement (comprising the sealing elements and the at least one support element) to pressing in the stack direction at least in this distance region ($z>z_1$), concerning which a plastic deformation of the sealing elements is not to be feared. For large plate distances, the arrangement can therewith yield to changes of the plate distance, e.g. caused by temperature fluctuations occurring in operation, in an uninhibited or essentially uninhibited manner.

It is conceivable for the at least one support element to comprise at least one support element or a multitude of support elements, which is/are arranged and designed in a manner such that an intermediate space remains between at least one of the separator plates and this support element in the stack direction for $z>z_1$ with $z_1>z_2$. This support element or these support elements can then further be arranged and designed in a manner such that the at least one intermediate space becomes zero for $z\leq z_1$. In other words, this support element or these support elements can be arranged and designed in a manner such that it/they is/are not in contact with the two separator plates of the arrangement until plate distances z of $z\leq z_1$ in the stack direction.

The sealing elements of the separator plates can each comprise a perimeter bead which encloses the electrochemical cell and which seals the electrochemical cell with respect to an environment of the electrochemical arrangement. The at least one support element can then comprise e.g. at least one support element or a multitude of support elements which in a direction which runs parallel to the plate planes of the separator plates is/are arranged on a side of the perimeter bead which is away from the electrochemical cell. This support element or these support elements are therefore arranged outside the region which is sealed off by the perimeter bead. However, it is likewise conceivable for the at least one support element to comprise at least one support element which is arranged within the region which is sealed off by the perimeter bead.

Typically, the at least one support element comprises at least one support element or several support elements which at least in regions comprises/comprise an electrically insulating material or which at least in regions is/are formed of an electrically insulating material. The electrically insulating material is then preferably arranged in a manner such that at each distance z of the metallic separator plates to one another, no electrical contact between the metallic separator plates can be created via this support element. In particular, with such applications, concerning which the separator plates can lie at different electrical potentials, an electrical short circuit between the metallic separator plates can be prevented in this manner. It is also conceivable for at least one or several of the support elements of the at least one support element to be formed completely from an electrically insulating material. Preferably, the support elements, which for avoiding an electrical a short circuit between the separator plates comprise an electrically insulating material, comprise at least those support elements which are arranged outside the region which is sealed off by the perimeter bead.

At least one or several of the support elements of at least one support element can comprise a thermoplastic material, a thermoplastic elastomer and/or a ceramic material. It is likewise conceivable for at least one or more of the support elements of the at least one support element to comprise a polymer-based and/or a metallic support fabric. At least one or several of the support elements of the at least one support element can be materially and/or non-positively and/or positively connected to at least one of the separator plates.

The electrochemical cell can comprise a frame. Furthermore, the electrochemical cell can comprise at least one membrane which is embedded in the frame, in particular an electrolyte membrane or a water transfer membrane. Usually, the membrane is sealingly received between the sealing elements of the separator plates which are supported on one another. Preferably, a gas diffusion layer is further arranged on both sides of the membrane. At least one or several of the support elements of the at least one support element can be materially and/or positively connected to the frame.

At least one or more of the support elements of the at least one support element can be designed in a manner such that it/they can each be stuck onto at least one of the separator plates, e.g. in a direction which runs parallel to the plate planes of the separator plates. Preferably, this support element or these support elements can then each be releasably stuck onto at least one of the separator plates.

The separator plates each usually comprise at least one through-opening for leading a medium through the separator plate. The at least one sealing element of the separator plates can then each comprise at least one port bead which is embossed into the separator plate, wherein a port bead is arranged peripherally around each of the through-openings for sealing the through-openings. One or more of the support elements of the at least one support element can then be arranged on a side of the port bead which is away from the through-opening. However, it is also conceivable for one or more of the support elements of the at least one support element to be arranged within the region which is sealed off from the port bead. The port bead can then comprise feed-throughs, which create a fluid connection between the through-opening which is enclosed by the port bead, and the electrochemical cell. A media flow through the feed-throughs is then possible via the cross section of the feed-throughs. Usually, the at least one support element is distanced to the port bead in a direction which runs parallel to the plate planes of the separator plates.

Each of the separator plates can comprise two metallic individual plates. For forming the separator plate, the individual plates can be connected to one another e.g. materially, preferably by way of a weld connection, particularly preferably by way of a laser weld connection. Each of the individual plates can comprise at least one sealing element which is embossed into this individual plate and which is elastic in the stack direction. The sealing elements of the individual plates are then identical to the previously mentioned sealing elements of the separator plates. In particular therefore each of the individual plates can comprise at least one perimeter bead and/or at least one port bead.

The electrochemical arrangement which is suggested here can further comprise a holding element which is arranged e.g. laterally on the stack which is formed by the separator plates of the arrangement. The at least one support element of the arrangement can comprise a multitude of support elements which are each connected to the holding element or which are each designed as one part with the holding element.

What is further put forward is an electrochemical system with a multitude of electrochemical arrangements of the previously described type, which are stacked along a common stack direction. This means that the common stack direction of the system and the stack directions of the arrangements of the system are aligned in parallel. If the electrochemical system comprises a holding element of the previously described type, then this holding element can extend along the stack direction over a multitude of the electrochemical arrangements. The holding element can then be connected to a multitude of support elements of different arrangements of the system or be designed as one part with these support elements.

Embodiment examples of the electrochemical arrangement which is put forward here and of the electrochemical system which is put forward here are represented in the figures and are explained in more detail by way of the subsequent description. Herein, different elements which are essential to the invention or also advantageous further developments are mentioned within the framework of these examples, wherein individual ones of these elements as such can also be used for the further development of the invention—even taken out of context of the respective example and of the further features of the respective example. Furthermore, in the figures, the same or similar reference numerals are used for the same or similar elements and their explanation has therefore been omitted to some extent. There are shown in:

BRIEF DESCRIPTION OF THE FIGURES

FIG. 1 schematically, an embodiment of an electrochemical system according to the invention, with a multitude of electrochemical arrangements which are arranged in a stack and which each comprise two metallic separator plates and an electrochemical cell which is arranged between the separator plates;

FIG. 3a schematically, a detail of the electrochemical system of FIG. 1 in a sectioned representation according to the section line A-A in FIG. 2;

FIG. 3b schematically, a detail of the electrochemical system of FIG. 1 in a sectioned representation according to the section line B-B in FIG. 2;

FIG. 5a schematically, support element according to the invention with a cavity, in a sectioned representation;

FIG. 5b schematically, support element according to the invention with a cavity, in a sectioned representation;

FIG. 6a schematically, sectioned representation of an inventive individual plate of a metallic separator plate with a sealing bead which is embossed into the individual plate, and of a support element according to a further embodiment, amid the action of pressing forces of a different strength;

FIG. 6b schematically, sectioned representation of an inventive individual plate of a metallic separator plate with a sealing bead which is embossed into the individual plate, and of a support element according to a further embodiment, amid the action of pressing forces of a different strength;

FIG. 6c schematically, sectioned representation of an inventive individual plate of a metallic separator plate with a sealing bead which is embossed into the individual plate, and of a support element according to a further embodiment, amid the action of pressing forces of a different strength;

FIG. 6d schematically, force-displacement characteristic lines of the sealing bead and of the support element according to FIG. 5a and FIG. 5b;

DETAILED DESCRIPTION

Figure 2:
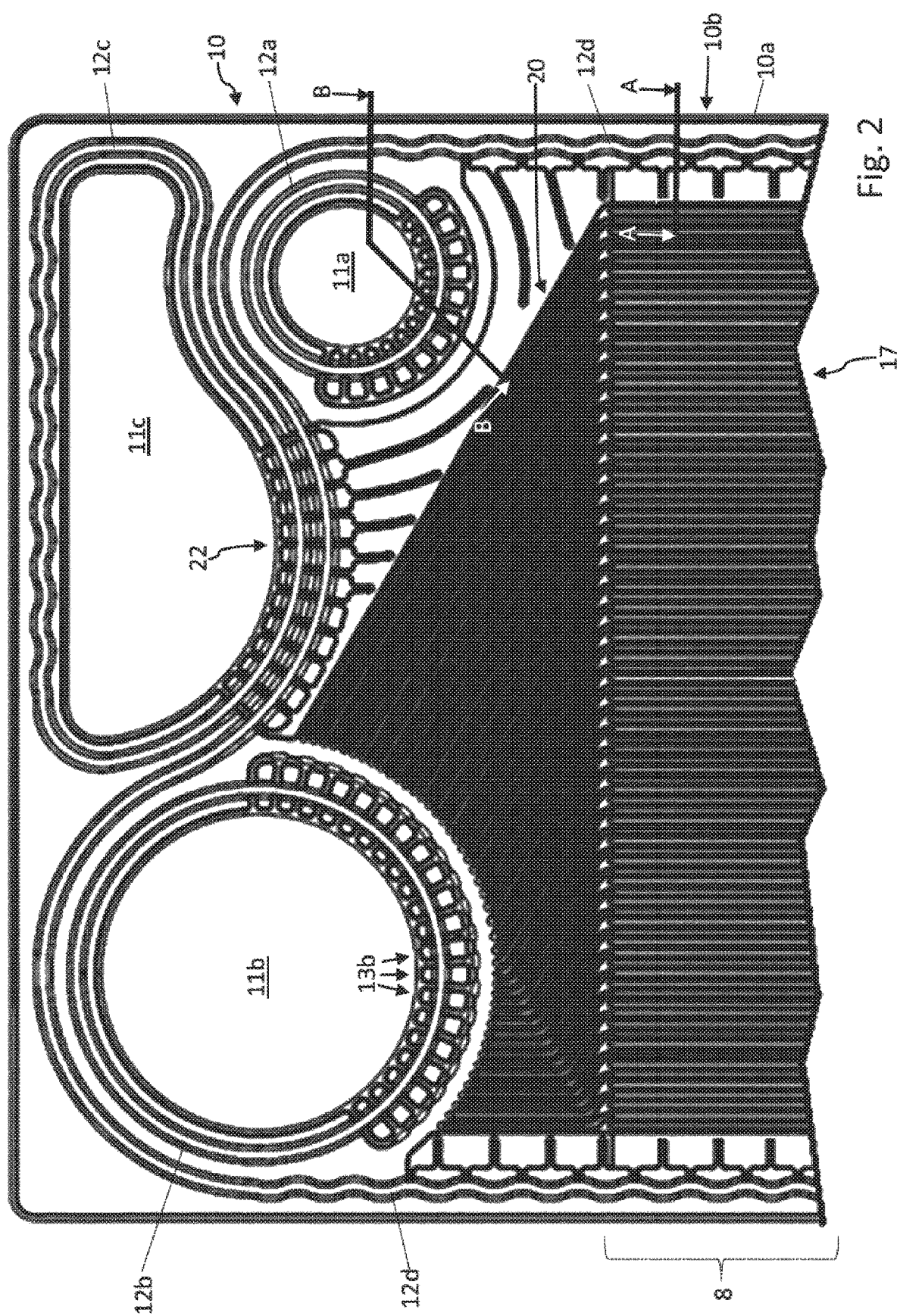
FIG. 2 schematically, a metallic separator plate according to the invention, in a plan view.

FIG. 1 shows an electrochemical system 1 according to the invention with a stack 32 with a plurality of metallic separator plates 10 which are constructionally identical, are stacked along a z-direction 6 and are clamped between two end plates 3, 4. The z-direction 6 is also called the stack direction. The separator plates 10 each comprise two individual plates 10a, 10b which are connected to one another (see e.g. FIG. 3a). In the present example, the system 1 is a fuel cell stack. Two adjacent separator plates 10 of the stack 32 between them therefore enclose an electrochemical cell which serves e.g. the conversion of chemical energy into electrical energy, and with this cell each form an electrochemical arrangement. The stack 32 of the system 1 therefore comprises a multitude of electrochemical arrangements which are stacked in the z-direction 6. The electrochemical cells usually each comprise a membrane electrode assembly (MEA) 14 which comprises a membrane 15, e.g. an electrolyte membrane, as well as gas diffusion layers (GDL) 16 (see e.g. FIG. 3a). Given alternative embodiments, the system 1 can just as well be designed as an electrolyser, compressor or as a redox-flow battery. Concerning these electrochemical systems, separator plates can likewise be used. The construction of these separator plates corresponds to the construction of the separator plates 10 which are described here in more detail, even if the media which are led on or through the separator plates can be different.

The z-axis 6 together with an x-axis 80 and a y-axis 90 spans a right-handed Cartesian co-ordinate system. The end plate 4 comprises a multitude of media connections 5, via which mean can be fed to the system 1 and via which media can be discharged from the system 1. These media which can be led to the system 1 and out of the system 1 can include e.g. fuels such as molecular hydrogen or methanol, reaction gases such as air or oxygen, reaction products such as water vapour or coolant such as water and/or glycol.

FIG. 2 in a plan view shows a detail of one of the separator plates 10 of the system of FIG. 1. The separator plate 10 is formed from two metallic individual plates 10a, 10b which are materially joined together, of which only the first individual plate 10a which covers the second individual plate 10b is visible in FIG. 2. The individual plates 10a, 10b can each be manufactured of a metal sheet, e.g. of a stainless steel sheet. The individual plates 10a, 10b comprise through-openings which are aligned to one another and which form the through openings 11a, 11b, 11c of the separator plate 10. In the stack 32 of the system 1 according to FIG. 1, the through-openings 11a-c of the separator plates 10 comprise conduits which extend through the stack 32 in the stack direction 6. Typically, each of the conduits which are formed by the through-openings 11a-c is in fluid connection with one of the medial connections 5 on the end plate 4 of the system 1. For example, the conduits which are formed by the through-openings 11a, 11b serve for the supply of the electrochemical cells of the fuel cell stack with fuel and reaction gas. In contrast, coolant can be led into the stack 32 or led out of the stack 32 via the conduit which is formed by the through-opening 11c.

For sealing the through-openings 11a-c with respect to the inside of the stack and with respect to the surroundings, the first individual plate 10a comprises sealing elements in the fashion of port beads 12a-c which are each arranged around the through-openings 11a-c and which each completely enclose the through-openings 11a-c. The port beads 12a-c are each shaped, in particular embossed into the individual plate 10a. The second individual plate 10b at the rear side of the separator plate 10 which is away from the viewer of FIG. 2 comprises corresponding port beads for sealing the through-openings 11a-c (not shown). The port beads 12a-c are elastically, thus reversibly deformable at least perpendicular to the plate plane which in FIG. 2 is aligned parallel to the plane of the drawing and hence along the z-direction 6.

In an electrochemically active region 8 of the separator plate 10, the first individual plate 10a at its front side which faces the viewer of FIG. 2 comprises a flow field 17 with structures for leading a media along the front side of the individual plate 10a. These structures comprise e.g. a multitude of webs and channels which are arranged between the webs and which are embossed for example into the individual plate 10a. In FIG. 2, only a detail of the active region 8 on the front side of the separator plate 10 is shown.

At the front side of the separator plate 10 which faces the viewer of FIG. 2, the first individual plate 10a furthermore comprises a distributing or collecting region 20 which in turn comprises structures for leading a medium along the front side of the individual plate 10a, wherein these structures typically likewise comprise webs and channels which are arranged between the webs. The distributing or collecting region 20 creates a fluid connection between the through-opening 11b and the active region 8. The channels of the distributing or collecting region 20 are therefore in fluid connection with the through-opening 11b or with the conduit through the stack 32, said conduit being formed by the through-opening 11b, via feed-throughs 13b through the port bead 12b. A medium which is led through the through-opening 11b can therefore be led via the feed-throughs 13b in the bead 12b and via the channels of the distributing or collecting region 20 into the channels of the flow field 17 in the active region 8 of the bipolar plate 10 or vice versa.

The through-opening 11a or the conduit through the plate stack 32, said conduit being formed by the through-opening 11a, in a corresponding manner is usually in fluid connection with a distributing and collecting region and via this with a flow field, at the rear side of the separator plate 10 which is away from the viewer of FIG. 2. In contrast, the through-opening 11c or the conduit through the stack 32, said conduit being formed by the through-opening 11c, is in fluid connection with an interior 22 which is enclosed or encompassed by the individual plates 10a, 10b and which is designed for leading a coolant through the separator plate 10.

Finally, yet a further sealing element in the fashion of a perimeter bead 12d which is peripheral around the flow field 17 of the active region 8, the distributing or collecting region 20 and the through-openings 11a, 11b and seals these with respect to the through-opening 11c, i.e. with respect to the coolant circuit and with respect to the surroundings of the system 1 is embossed into the first individual plate 10a. Concerning alternative embodiments, the perimeter bead 12d can also additionally enclose the through-opening 11c. The perimeter bead 12d as the with the port beads 12a-c is elastically, thus reversibly deformable perpendicular to the plate plane and hence along the z-direction 6.

The support elements are not represented in FIG. 2 and are not explained until by way of the subsequent figures.

FIG. 3a shows a detail of the stack 32 of the electrochemical system 1 of FIG. 1 in a sectioned representation, wherein the section plane is aligned along the line A-A of FIG. 2 parallel to the x-z plane. The stack 32 comprises a multitude of metallic separator plates 10 of the type of separator plate 10 according to FIG. 2 and these are stacked in the z-direction 6. The separator plates 10 of the stack 32 here are each designed in an identical manner. The separator plates 10 define plate plates which are aligned perpendicularly to the z-direction 6. It is clearly recognisable from FIG. 3a that the metallic separator plates 10 are each formed from two metallic individual plates 10a, 10b which are connected to one another. The representation of possibly present coatings has been omitted here for the purpose of a better overview.

Further represented are the active regions 8 of the separator plates 10 or of the individual plates 10a, 10b, said active regions each comprising a flow field 17 with channels and webs which are embossed into the individual plates 10a, 10b. The structures of the flow fields 17 serve for leading reaction media on the outer sides of the separator plates 10 and for leading a coolant through the interiors 22 of the separator plates 10 which are enclosed by the individual plates 10a, 10b. In the active regions 8, a membrane electrode assembly (MEA) 14 is arranged between each two adjacent separator plates 10 of the stack 32. As previously explained, the MEAs 14 for example each comprise a membrane 15, e.g. an electrolyte membrane, and gas diffusion layers 16 (GDL) which are arranged on both sides of the membrane 15. The GDLs 16 are e.g. each formed from a metal non-woven or carbon non-woven and permit the media which are led in the active regions 8 to also be able to flow onto the membranes 15 in the regions of the webs of the flow fields 17.

The electrochemical cells which are arranged between adjacent separator plates 10, with the active regions 8 are each sealed with respect to the surroundings of the system 1 by way of perimeter beads 12d which are embossed into the individual plates 10a, 10b and which are elastic at least in the z-direction 6. The membranes 15 are each embedded into a reinforced frame 18 at the edge of the active region 8 and towards the perimeter beads 12d. The frame 18 is sealingly received between the perimeter beds 12d of adjacent separator plates 10 of the stack 32. The elastic port beads 12a-c of two adjacent separator plates 10 of the stack 32 are each supported against one another via the frame 18 and seal those through-openings 11a-c, around which they run, to the outside and to the inside of the stack 32 (not shown in FIG. 3a).

In normal operation of the system 1, the plate planes of adjacent separator plates 10 of the stack 32 have a distance of $z_0$ to one another, said distance being defined along the z-direction 6. In order for the beads 12a-d to be able to fulfil their sealing effect, the beads 12a-d are usually already slightly elastically compressed along the z-direction 6 on normal operation due to a prestressing (biasing) which is introduced into the stack 32 via the end plates 3, 4 (see FIG. 1). In this state, the frames 18 each have a thickness ΔM (see detail figure) which is likewise defined along the z-direction 6. In FIG. 3a it is recognisable that the plate distance $z_0$ between adjacent separator plates 10 in normal operation is determined by the height h of the perimeters beads 12d of individual plates 10a, 10b which face one another, of adjacent separator plates 10, said height being defined along the z-direction, and by the thickness ΔM of the respective frame 18 of the membrane 15 which is sealingly received between the perimeter beads 12d, so that $z_0=2\cdot+\Delta M$. Furthermore, the value of $z_0$ is usually dependent on the mentioned prestressing of the stack 32 and possibly on the operating temperature of the stack 32.

Usually, the height h of the perimeter beads 12d which are embossed into the individual plates 10a, 10b is larger than a maximal height, defined along the z-direction 6, of the structures 17 which are likewise embedded into the individual plates 10a, 10b, of the active regions 8 of the electrochemical cells, said electrochemical cells being arranged between the separator plates 10. The plate distance $z_0$ on normal operation of the system 1 can be e.g. between 0.4 mm and 2 mm. The plate distance $z_0$ in normal operation can however just as well assume smaller or larger values.

The electrochemical system 1 which is suggested here, compared to known systems is characterised in particular in that support elements 19a, 19b are arranged between adjacent separator plates 10 of the stack 32. The support elements 19a, 19b serve for the purpose of protecting the beads 12a-d of the separator plates 10 of the stack 32 from irreversible plastic deformation. Such irreversible plastic deformation of the beads 12a-d can occur if strong mechanical forces act upon the stack 32, e.g. along the z-direction 6 perpendicularly to the plate planes of the separator plates 10.

In particular, the support elements 19a, 19b act as absorbers which are designed to absorb as completely as possible the forces which act upon the stack 32 in the z-direction 6 and which in the absence of the support elements 19a, 19b would effect an irreversible compression of the beads 12a-d, and hence to prevent a damage to the beads 12a-d. If the fuel cell system 1 is used for the generation of electrical energy in a vehicle, such forces could occur e.g. given a collision by accident. Irreversible plastic deformations of the sealing elements of the separator plates 10 could compromise the sealing effect of the sealing elements and lead leakages of reaction gas and/or coolant. This can compromise the efficiency of the system 1 or even render the operation of the system 1 impossible. Furthermore, exiting reaction gases represent a significant safety risk (danger of fire and explosion).

The support elements 19a, 19b or at least some of them can comprise e.g. a thermoplastic material, in particular thermoplastics without fibre reinforcement, or a thermoplastic elastomer, e.g. TPVs, in particular EPDM-PP blends or NBR-PP blends, possibly also extrudable TPUs or be formed completely from one of these materials. E.g. the support elements 19a, 19b can comprise a foamed material, such as for example a foamed thermoplastic or a foamed thermoplastic elastomer. The thermoplastic elastomer can be selected from the group of thermoplastic polyurethane elastomers (TPE-U) and thermoplastic polystyrene block copolymers (TPE-S). They can comprise a peripheral injecting and/or an outer skin which can be formed as one piece with the actual body of the support element by way of foam injection moulding from the respective thermoplastic elastomer amid the use of at least one chemical and/or physical propellant such as nitrogen, carbon dioxide, or low-boiling-point hydrocarbons, in particular by way of evaporation or expansion of the propellant.

The support elements 19a, 19b or at least some of them can also comprise ceramic material. The support elements 19a, 19b or some of them can just as well comprise a polymer-based and/or a metallic support fabric.

The support elements 19a, 19b can e.g. each have a rectangular or round cross section parallel to the plate planes of the separator plates. However, other shapes are also conceivable. The support elements 19a, 19b are arranged at a distance to the port beads 12a-c and to the perimeter bead 12d, in a direction which runs parallel to the plate planes of the separator plates 10. In order for them to be able to effectively prevent an undesired plastic deformation of the beads 12a-d, a distance of the support elements 19a, 19b to a bead which is next adjacent to the respective support element 19a, 19b, said distance being defined parallel to the plate planes of the separator plates 12, should preferably not exceed a maximal distance $L_{max}$. For example, it can be the case that $L_{max} \leq 3 \cdot A$, $L_{max} \leq 2 \cdot A$ or $L_{max} \leq A$, wherein A is a foot width of this bead which is defined transversely to the running direction of the respective bead 12a-d. Concerning the embodiment which is represented in FIG. 3a, the support elements 19a are each arranged within the regions of the separator plates 10 which are enclosed and sealed off by the perimeter beads 12d. In contrast, the support elements 19b are each arranged outside the regions of the separator plates 10 which are enclosed and sealed off by the perimeter beads 12d.

In FIG. 3a, the support elements 19a, 19b further are each materially connected to the frames 18, into which the membranes 15 are embedded. Concerning other embodiment examples, the support elements 19a, 19b or at least some of them can e.g. also be materially connected to the separator plates 10, as is shown for example in FIG. 5. E.g. the support elements 19a, 19b can be bonded to the frames 18 and/or to the separator plates 10 or be connected by way of material deposition. In FIG. 3a, the support elements 19a, 19b are attached to the frames 18 on both sides. In particular, concerning the embodiment example of FIG. 3a, the frame 18 extends in a direction parallel to the plate plates of the separator plates 10 on both sides of the perimeter beads 12d, thus within as well as outside the region of the separator plates 10 which is enclosed and sealed off by the perimeter beads 12d. The individual plates 10a, 10b of the separator plates 10 further each comprise half-beads 21*a*, 21*b* on their outer edges. An outer edge of the frames 18 extends parallel to the plate planes of the separator plates 10 up to the outer edge of the separator plates 10.

Concerning the embodiment example of FIG. 3*a*, the support elements 19*a*, 19*b* are arranged along the z-direction 6 between a separator plate 10 and the frame 18 which is directly adjacent to this separator plate 10. A separator plate 10 and a frame 18 are therefore arranged alternately between support elements 19*a*, 19*b* which are adjacent along the z-direction 6.

The support elements 19*a*, 19*b* are arranged between the separator plates 10 and in particular are dimensioned along the z-direction 6, in a manner such that at least when a pressing force which in the absence of the support elements would effect an irreversible plastic deformation of the beads 12*a*-*d* acts upon the stack 32 in the z-direction 6, they are supported against one another in the z-direction 6 (see e.g. FIG. 7) and/or against the metallic separator plates 10 (see e.g. FIG. 3*a*), in order to prevent an irreversible plastic deformation of the beads 12*a*-*d*. E.g. concerning the embodiment example which is shown in FIG. 3*a*, a height of the support elements 19*a*, 19*b* which is defined along the z-direction 6, already on normal operation of the system 1 when the plate distance between the plate planes of adjacent separator plates 10 of the stack 32 is $z_0$, corresponds to the height h of the perimeter beads 12*d* of the individual plates 10*a*, 10*b*. The supports elements 19*a*, 19*b*, given a plate distance $Z_0$ in the z-direction 6, reach up to a separator plate 10 and to the frame 18 which is directly adjacent to this separator plate 10 and are in contact with both.

FIG. 3*b* likewise shows a detail of the stack 32 of the electrochemical system 1 of FIG. 1 in a sectioned representation, wherein the section plane runs along the line B-B of FIG. 2. Starting from the outer edge of the stack 32, the individual plates 10*a*, 10*b* successively comprise half beads 21*a*, 21*b*, a perimeter bead 12*d*, a combination of port bead 12*a* and half-beads 21*a*', 21*b*' which as a combination is peripheral around the through-opening 11*a*, as well as a short section of the distributing region 20. The port bead 12*a* and the half-bead 21' in the region which faces the distributing region 20 each comprise feed-throughs 13*a* which permit a leading of fluid from the through-opening 11*a* to the distributing region 20 and further to the flow field. The MEA does not extent into this region, in contrast sections of the frame 18 are arranged between the separator plates 10. As in FIG. 3*a*, the support elements 19*b* are attached to the frame sections 18, wherein here they extend between the perimeter bead 12*d* and the port bead 12*a*.

FIGS. 4*a*-*c* in a sectioned representation each schematically show an embodiment of an individual plate 10*a* of the stack 32 and of a support element 19 which is arranged on this individual plate 10*a*, in a sectioned representation. The support element 19 according to the FIGS. 4*a*-*c* with its characteristics which are described here is to be representative of support elements which are arranged between two adjacent separator plates 10 of the stack 32. Here therefore, the support element 19 according to the FIGS. 4*a*-*c* is representative of one or more of the support elements 19*a*, 19*b*, 19*c*, 19*d*, 19*f*, 19*g*, 19*h* which are described previously and hereinafter, in particular also of combinations of these. The support element 19 of FIGS. 4*a*-*c* here is connected to the individual plate 10*a*, e.g. by way of a bonding connection. A perimeter bead 12*d* is embossed into the individual plate 10*a*. The characteristics of the perimeter bead 12*d* which are described in the FIGS. 4*a*-*d* can however likewise be valid for the port beads 12*a*-*c* or for the entirely of the beads 12*a*-*d* (see e.g. FIG. 2).

In particular, the FIGS. 4*a*-*c* show the perimeter bead 12*d* and the support element 19 each at a different degree of pressing of the stack 32 in the z-direction 6, wherein the degree of pressing is each characterised by the distance z of the plate planes of adjacent separator plates 10 of the stack 32. The situations which are represented in the FIGS. 4*a*-*c* herein correspond to the distances $z_0$, $z_1$ and $z_2$ between adjacent separator plates 10 of the stack 32, wherein $z_0 > z_1 > z_2$. As was hitherto the case, $z_0$ represents the plate distance in normal operation. Since only a part of the symmetrical arrangement of two separator plates 10 or of two individual plates 10*a*, 10*b*, of the frame 18 with the thickness $\Delta M$ which is received between the separator plates 10 or between the individual plates 10*a*, 10*b* and of the support elements 19 which are arranged between the separator plates 10 or between the individual plates 10*a*, 10*b* is shown in FIGS. 4*a*-*c* (see e.g. FIG. 3*a*), the height h of the bead 12*d* which is defined along the z-direction 6, given a plate distance z is herein $(z-\Delta M)/2$, wherein the thickness $\Delta M$ of the frame 18 can also possibly slightly decrease with an increasing pressing. The height h of the bead 12*d* in normal operation of the system 1 can assume a value e.g. of between 0.3 mm and 0.6 mm.

For each of the plate distances $z_0$, $z_1$, and $z_2$, herein the force $F_D(z)$ which in the z-direction 6 which only acts upon the sealing element (here the bead 12*d*) and the force $F_S(z)$ which in the z-direction 6 only acts upon the support element 19 are represented by an arrow, wherein the length of the arrow is a measure of the magnitude of the force. The forces $F_D(z)$ and $F_S(z)$ can be introduced into the stack 32 e.g. via the end-plates 3, 4 of the system 1.

What can be clearly derived from FIGS. 4*a*-*c* is the fact that the greater the forces $F_D(z)$ and $F_S(z)$, the more greatly is the stack 32 pressed in the z-direction 6, i.e. the smaller is the distance z between the plate planes of adjacent separator plates 10 of the stack 32. Since the forces always occur in pairs (action=reaction), the force $F_D(z)$ at the same time is a measure of the resistance with which the bead 12*d* opposes its compression to the bead height of $h(z)=(z-\Delta M)/2$. The force $F_S(z)$ is likewise a measure of the resistance with which the support element 19 opposes its compression in the z-direction 6. Depending on the plate distance z, the pressing force which is introduced into the stack 32 e.g. via the end plates 3, 4 of the system 1 is therefore distributed in a different manner onto the force $F_D(z)$ which acts upon the at least one sealing element and onto the force $F_S(z)$ which acts upon the at least one support element.

Figure 4:
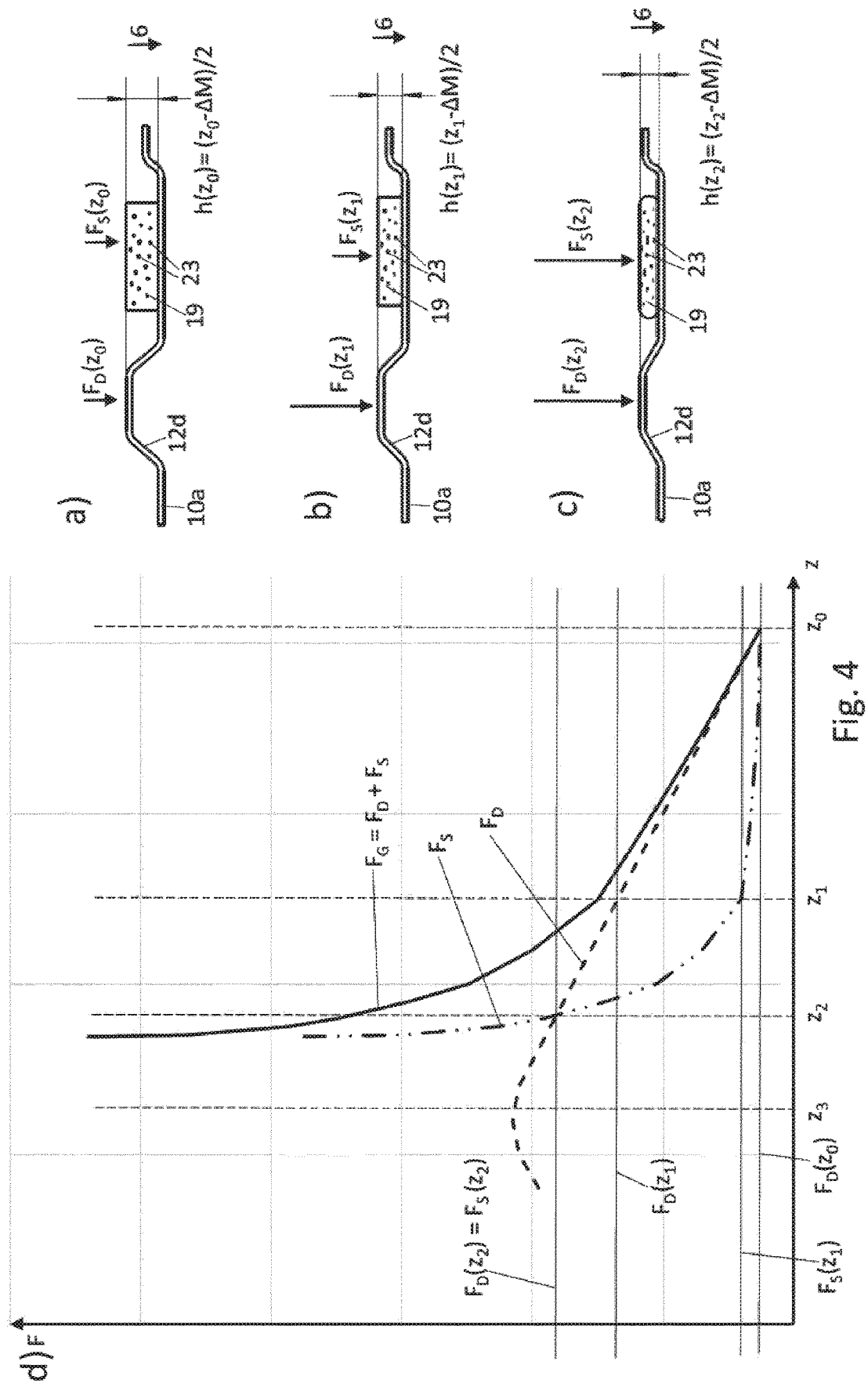
FIG. 4a schematically, sectioned representation of an individual plate according to the invention, of a metallic separator plate with a sealing bead which is embossed into the individual plate, and of a support element according to one embodiment, amid the action of pressing forces of different strengths.
FIG. 4b schematically, sectioned representation of an individual plate according to the invention, of a metallic separator plate with a sealing bead which is embossed into the individual plate, and of a support element according to one embodiment, amid the action of pressing forces of different strengths.
FIG. 4c schematically, sectioned representation of an individual plate according to the invention, of a metallic separator plate with a sealing bead which is embossed into the individual plate, and of a support element according to one embodiment, amid the action of pressing forces of different strengths.
FIG. 4d schematically, force-displacement characteristic lines of the sealing bead and of the support element according to FIG. 4a, FIG. 4b, and FIG. 4c.

The force-displacement characteristic lines $F_D(z)$ and $F_S(z)$ are represented in FIG. 4*d* as continuous functions of the distance z between the plate planes of adjacent separator plates 10 of the stack 32, wherein the distance values $z_0$, $z_1$ and $z_2$ which correspond to the situations which are shown in the FIGS. 4*a*-*c* is highlighted by dashed vertical lines. Furthermore, in FIG. 4*d* the forces $F_D(z_0)$, $F_D(z_1)$, $F_S(z_1)$, $F_D(z_2)$ and $F_S(z_2)$ which act upon the bead 12*d* and upon the support element 19 at the plate distances $z_0$, $z_1$ and $z_2$ according to the FIGS. 4*a*-*c* are highlighted by horizontally running dashed lines. Furthermore, in FIG. 4 the total force $F_G(z)=F_D(Z)+F_S(z)$ which acts upon the bead 12*d* and upon the support element 19 and which is introduced into the stack 32 e.g. via the end plates 3, 4 is represented as a further force-displacement characteristic line.

The characteristic line $F_G(z)$ can be recorded/plotted e.g. with the stepwise pressing of the stack 32 by way of a force sensor, wherein the stack 32 comprises the separator plates 10 with the shaped-in beads 12*a-d*, and the support elements 19 which are arranged between the separator plates 10 (see e.g. FIG. 3*a*). E.g. the force sensor can record the pressing force which is exerted upon the end plates 3, 4. Alternatively, the force can be determined for example also for an electrochemical cell and the two separator plates which delimit it, with the aid of separate flange plates. The sealing element characteristic line $F_D(z)$ can be recorded e.g. given a stepwise pressing of a stack of separator plates of the type of separator plates 10 with the shaped-in perimeter bead 12*d* (and possibly additionally with the shaped-in port beads 12*a-c*), wherein the support elements between the separator plates are however removed, so that no support elements are arranged between the separator plates on pressing the stack and on recording the characteristic line. More too, the characteristic line $F_S(z)$ can be recorded e.g. given the stepwise pressing of a stack of plane separator plates without shaped-in beads, wherein the same support elements 19 are arranged between the plane separator plates as on recording the characteristic line $F_G(z)$. Alternatively, the support element characteristic line $F_S(z)$ can also be determined from the difference of the characteristic lines $F_G(z)$ and $F_D(z)$: $F_S(z)=F_G(z)-F_D(z)$.

In the F-z representation of FIG. 4*d*, the energy which is stored in the perimeter bead 12*d* as a result of a pressing of the perimeter bead 12*d* along the z-direction 6 is given by the respective area below the curve $F_D(z)$. Likewise, the energy which is stored in the support element 19 as a result of a pressing of the support element 19 along the z-direction 6 is given by the respective area below the curve $F_S(z)$.

The elastic behaviour of the bead 12*d* given plate distances z of $z_3 < z < z_0$ can be clearly derived from the force-displacement characteristic line $F_D(z)$ of the bead 12*d*, this being characterised by the linear course of the characteristic line $F_D(z)$ in this region. In the case of plate distances z in the region $z_3 < z < z_0$, a slight deviation of the course of the characteristic line $F_D(z)$ from an ideal linear course can be down to the bead 12*d* not having got completely back to its original, non-deformed geometry after a first compression (hysteresis). The bead 12*d* is designed in a manner such that an even greater pressing of the bead 12*d* beyond $z_3$, i.e. for plate distances z of $z < z_3$ leads to an irreversible plastic deformation of the bead 12*d*. In the diagram of FIG. 4*d*, this is above all characterised by the descent of the characteristic line $F_D(z)$ towards small plate distances in the region $z < z_3$.

The support element 19 which is represented in the FIGS. 4*a-c* comprises a multitude of pores 23. E.g. the support element 19 of FIGS. 4*a-c* is formed from a foamed elastomer. The pores 23 in the non-loaded state e.g. can be roughly spherical and have a typical diameter between 0.01 mm and 0.15 mm. The pores 23 of the support element can be completely or at least partly compressed by a pressing force which acts upon the stack 32 in the z-direction 6, this significantly influencing the course of the support element characteristic line $F_S(z)$.

Hence significantly different distance regions with a different behaviour of the support element characteristic line $F_S(z)$ can be recognised from the support element characteristic line $F_S(z)$ in the respective region. It is roughly with plate distances z of $z_1 < z < z_0$ that the resistance of the support element 19 to a compressing of the support element 19 in the z-direction 6 is predominantly determined by the geometry of those structures of the support element 19 which form the pores 23 which have not yet or not yet completely collapsed. In this region, the support element characteristic line $F_S(Z)$ which characterises the resistance of the support element 19 to a compressing or to a further compressing of the support element 19 is continuously below the sealing element characteristic line $F_D(z)$ of the bead 12*d* which characterises the resistance of the bead 12*d* to a compression or to a further compression of the bead 12*d*. Concerning the embodiment example which is described here, it is therefore the case that $F_S(z) < F_D(z)$ for all plate distances z with $z_1 < z < z_0$.

In other words, at each plate distance z in the region $z_1 < z < z_0$, it is the case that the force $F_D(z)$ which is required for the compressing or for the further compressing of only the bead 12*d* in the z-direction 6 by a displacement stretch $\Delta z'' > 0$ at this plate distance z is larger or the same as the force $F_S(z)$ which is required for the compressing or the further compressing of only the support element 19 in the z-direction 6 by the same distance stretch $\Delta z''$ given the same plate distance z. This means that the support element 19 or the support elements 19 is/are designed and in particular is/are dimensioned along the z-direction 6 in a manner such that the resistance of the stack 32 to a pressing or to a further pressing of the stack 32 in the z-direction 6 is predominantly determined by the resistance of the beads 12*a-d* to a further pressing in the case of only slight deformations of the beads 12*a-d* of the separators plates 12, thus given plate distances z of $z_1 < z < z_0$. Given plate distances z of $z_1 < z < z_0$ the support element 19 or the support elements 19 therefore hardly noticeably compromise the elastic deformability of the beads 12*a-d* which is indeed desirable at low plate distances. The beads 12*a-d* can therefore yield to slight deformations of the separator plates 10 and/or other components in the z-direction 6, said deformations being caused e.g. by temperature fluctuations occurring in the system 1 or by further other operating states, and herewith the beads maintain their sealing function without any compromise.

It is only at distances $z < z_1$ when the pores 23 of the support element 19 have at least partly or possibly completely collapsed as a result of the pressing force which acts upon the support element 19 in the z-direction 6 that the resistance of the support element 19 to a further compressing of the support element 19 in the z-direction 6 is predominantly determined by characteristics of the material from which the support element 19 is formed, other than its pore content and size, and greatly increases given a further reduction of the plate distance. The design of the bead 12*d* and the arrangement and design of the support element 19 is therefore such that for all plate distances z of $z < z_1$, the force $F_S$ which is necessary for the compressing or for the further compressing of only the support element 19 by a displacement $\Delta z''' > 0$ in the z-direction 6, given a further reduction of the plate distance z grows more rapidly than the force $F_D$ which is required for the further compression of only the bead 12*d* about the same displacement $\Delta z'''$ in the z-direction 6. Or in other words: $|dF_S(z)/dz| > |dF_D(z)/dz|$ for all plate distances z of $z < z_1$. Herein, $z_1$ here is e.g. the largest plate distance for which this relation is valid. For example, the characteristic line $F_S(z)$ can have a roughly exponential course at least in the region $z < z_1$.

Given a plate distance z of adjacent separator plates 10 of the stack 32 of $z = z_2$ with $z_2 < z_1 < z_0$, the support element characteristic line $F_S(z)$ and the sealing element characteristic line $F_D(z)$ intersect. E.g. the bead 12*d* can be designed and the support element 19 arranged and designed in a manner such that the pores 23 of the support element 19 are completely compressed or collapsed for all plate distances z of $z \leq z_2$. E.g. $z_2$ can be the largest plate distance at which the pores 23 of the support element 19 are completely compressed or collapsed. Herein, it is to be emphasised that the height h of the bead 12*d* at the plate distance $z = z_2$ is still significantly within that region, in which the bead 12d is elastically deformable. Therefore there is not yet any danger of an irreversible plastic deformation of the perimeter bead 12 given the plate distance $z=z_2$.

The bead 12d and the support element 19 are arranged and designed in a manner such that the support element characteristic line $F_S(z)$ runs continuously above the sealing element characteristic line $F_D(z)$ for all plate distances z of $z<z_2$. It is therefore the case that $F_S(z)>F_D(z)$ for all plate distances z of $z<z_2$, wherein $z_2$ here is the largest plate distance for which this relation is valid. This means that for all plate distances z of $z \leq z_2$, there is a displacement stretch of the length $\Delta z'>0$, so that the force $\Delta F_S=F_S(z-\Delta z')-F_S(z)$ which is required for the compressing or for the further compressing of only the support element 19 by the displacement stretch $\Delta z'$ in the z-direction 6 at each plate distance z of $z \leq z_2$ is larger than the force $\Delta F_D=F_D(z-\Delta z')-F_D(z)$ which given the same plate distance z is required for the further compressing of only the perimeter bead 12d by the same displacement stretch $\Delta z'$ in the z-direction 6.

The course of the sealing element characteristic line $F_D(z)$ is usually determined by the geometry of the bead 12d and by the material characteristics of the bead 12d. E.g. the course of the sealing element characteristic line $F_D(z)$ is determined by its height h, its foot width and its flank angle in the non-loaded state as well as by the thickness and/or by the material of the individual plate 10a, into which the bead 12d is shaped. And the course of the support element characteristic line $F_S(z)$ is typically determined by the geometry of the support element 19 and by the material characteristics of the support element 19. E.g. the support element 19 belonging to the embodiment which is represented in FIGS. 4a-c is designed in a manner such that its height which is defined along the z-direction 6 corresponds to the height h of the bead 12d at least for all plate distances z of $z \leq z_0$.

The size of the plate distance $z_1$, for which it is the case that $|dF_S(z)/dz|>|dF_D(z)/dz|$ for all $z<z_1$, and/or the size of the plate distance $z_2$, for which it is the case that $F_S(Z)>F_D(z)$ for all $z<z_2$, can each be adjustable by way of changing at least one or more of the following parameters:
 the height of the support element 19 which is defined along the z-direction 6 of the support element 19, in the non-loaded state of the support element 19;
 the size of the cross-sectional area of the support element 19 parallel to the plate plane of the separator plates 10 or the individual plates 10a, 10b;
 the modulus of elasticity of the material or at least one of the materials, from which the support element 19 is formed;
 the average size of the pores 23 of the support element 19 in the non-loaded state of the support element 19; and/or
 the volume share of the pores 23 of the support element 19 in relation to the total volume of the support element 19 in the non-loaded state of the support element 19.

E.g. the value of $z_1$ and/or the value of $z_2$ can be reduced towards smaller plate distances by way of an increase of the average size of the pores 23 of the support element 19 in the non-loaded state of the support element 19. E.g. the value of $z_1$ and/or the value of $z_2$ can be reduced towards smaller plate distances by way of increasing the volume share of the pores 23 of the support element 19 in relation to the total volume of the support element 19 in the non-loaded state of the support element 19a. E.g. the value of $z_1$ and/or the value of $z_2$ can be increased towards larger plate distances by way of an increase of the cross-sectional area of the support element 19a parallel to the plate planes of the separator plates 10 or of the individual plates 10a, 10b. And e.g. the value of $z_1$ and/or the value of $z_2$ can be increased towards larger plate distances by way of increasing the modulus of elasticity of the material of the support element 19a.

FIGS. 5a-b show further conceivable embodiments of support elements 19 according to the invention, indicated here as 19c and 19d, and specifically in a sectioned representation along a plane which is aligned parallel to the z-direction 6 and herewith perpendicular to the plate planes of the separator plates 10 or the individual plates 10a, 10b. The support elements 19c, 19d in the case of alternative embodiments of the stack 32 can replace e.g. all or at least one of the support elements 19a and possibly also 19b in FIG. 3a. In the FIGS. 5a-b, the support elements 19c, 19d are each connected to an individual plate 10a of a separator plate 10 of the stack 32, i.e. by way of a bonding connection. Alternatively, the support elements 19c, 19d or some of them can each likewise be connected to one of the frames 18 (see FIG. 3a).

The support elements 19c, 19d each comprise an outer wall 25 of an elastic material. E.g. the outer wall 25 is formed of a thermoplastic elastomer. The support elements 19c, 19d furthermore each comprise at least one cavity 24 which extends along the z-direction 6. A volume of the cavity 24 in the non-loaded state of the support elements 19c, 19d can fill e.g. at least 30 percent or at least 50 percent of the total volume of the respective support element 19c, 19d. The cavities 24 of the support elements 19c, 19d can be completely or at least partly collapsed or compressed in the z-direction 6 by way of a pressing force which acts upon the support elements 19c, 19d in the z-direction 6. The pressing force which is necessary for compressing or for the partial compressing of the support elements along the z-direction 6 depends amongst other things on the geometry of the outer wall 25, e.g. on the wall thickness of the outer wall 25, and/or on the modulus of elasticity of the material, from which the outer wall 25 is formed.

The cavities 24 of the support elements 19c, 19d can each be completely enclosed by the outer wall 25. Alternatively, the outer walls 25 can also comprise openings, through which a gas, e.g. air which is contained in the respective cavity 24 can escape out of the cavity 24 on compressing the cavity 24. The resistance of the support elements 19c, 19d to a compressing can be reduced by way of such openings in the outer walls.

The support element 19d of FIG. 5b differs from the support element 19c of FIG. 5 by way of a projection 26 which extends along the z-direction 6 and which projects at least partly into the cavity 24. The projection 26 can be connected e.g. to the outer wall 25 of the support elements 19d or be designed as one part with this. The course of the force-displacement characteristic line of the support element 19d can be influenced in a targeted manner by way of the elasticity of the material, from which the projection 26 is formed, and by the length of the projection 26 along the z-direction 6 (cf. the force-displacement characteristic lines of the support element 19 according to FIG. 4). E.g. the value of the plate distance $z_1$ and/or $z_2$ which is defined above can be adjusted in a targeted manner by way of the selection of the elasticity of the projection 26 and/or by way of the selection of the length of the projection 26 along the z-direction 6.

Analogously to the FIGS. 4a-c, FIGS. 6a-c each in a sectioned representation schematically show a further embodiment of an individual plate 10a of the stack 32 and a further embodiment of a support element 19 which is arranged on this individual plate 10a. As was prior the case, the support element 19 according to FIGS. 6a-c with its characteristics which are described here is to be representative of a further embodiment of a support element or of several support elements, which are arranged between two adjacent separator plates 10 of the stack 32. The support element 19 can be designed of an elastic material, e.g. of a thermoplastic elastomer. The support element 19 can be designed in a homogeneous manner. However, it is likewise conceivable for the support element to comprise pores which correspond to the pores 23 of the support element 19a according to the FIGS. 4a-d, or at least one cavity 24 which corresponds to the cavities 24 of the support elements 19c, 19d according to the FIGS. 5a-b.

Again, a perimeter bead 12d which is shaped (formed) into the individual plate 10a is also shown. As previously, the characteristics of the perimeter bead 12d which are described in the FIGS. 6a-d can however likewise apply to the port beads 12a-c or for the entirety of the beads 12a-d (see e.g. FIG. 2). Analogously to the representation of FIGS. 4a-c, FIGS. 6a-c show the perimeter bead 12d and the support element 19a each given a different degree of pressing of the stack 32 in the z-direction 6. And analogously to FIG. 4d, in FIG. 6d the force-displacement characteristic lines $F_D(z)$ and $F_S(Z)$ are represented as continuous functions of the distance z between the plate planes of adjacent separator plates 10 of the stack 32. Features and terms which have already been described in view of FIGS. 4a-d are not explained here in detail once again merely for the purpose of simplicity.

The arrangement according to the FIGS. 6a-c differs from the arrangement according to FIGS. 4a-c in that the support element 19 according to the FIGS. 6a-c compared to the support element 19 according to the FIGS. 4a-c are arranged and designed in a manner such that an intermediate space 31 remains between the support element 19 and the separator plate 10 which is directly adjacent to the support element 19 or between the support element 19 and the frame 18 which is directly adjacent to the support element 19, for all plate distances z of $z>z_1$ along the z-direction 6. Concerning the plate distance $z_0$, this intermediate space 31 can extend along the z-direction 6, e.g. over a length D (see FIG. 6a). This means that a height of the support element 19, defined along the z-direction 6, according to the FIGS. 6a-c is smaller than the height of the perimeter bead 12d given a plate distance $z_0$ in normal operation of the system 1.

The support element 19 according to FIGS. 6a-c is designed and arranged in a manner such that the mentioned cavity 31 disappears for the first time by way of pressing the stack 32 along the z-direction 6, when the plate distance of adjacent separator plates 10 of the stack 32 is reduced to the value $z_1$. For plate distances z of $z>z_1$ the support element 19 therefore offers no resistance to the pressing of the stack 32 in the z-direction 6. This is equivalent to saying that the force $F_S(z)$ which acts in the z-direction 6 only upon the support element 19 becomes zero for all plate distances z of $z>z_1$ (i.e. $F_S(z)=0$).

As was hitherto the case, concerning the embodiment example of FIGS. 6a-c, the design of the bead 12d and the arrangement and design of the support element 19 are such that the support element characteristic line $F_S(z)$ of the support element 19 and the sealing element characteristic line $F_D(Z)$ of the bead 12d intersect one another at the plate distance $z=z_2$. For the embodiment example of FIGS. 6a-c it is therefore also the case that $F_S(z)<F_D(z)$ for all z of $z>z_2$, as well as $F_S(z)>F_D(z)$ for all z of $z<z_2$. And as previously, it is also the case that $|dF_S(z)/dz|>|dF_D(z)/dz|$ for all z of $z<z_1$. In particular, the bead 12d and the support element 19 are therefore designed in a manner such that for all plate distances z of $z<z_1$, the force $F_S$ which is required for the compressing or for the further compressing of only the support element 19 by a displacement $\Delta z'''>0$ in the z-direction 6, given a further reduction of the plate distance z grows more rapidly than the force $F_D$ which is required for the further compressing of only the bead 12d by the same displacement $\Delta z'''$ in the z-direction 6.

The subsequent figures show further stacks 32 of the system 1 each in a state, in which the plate distances e.g. are each $z=z_0$.

Figure 7:
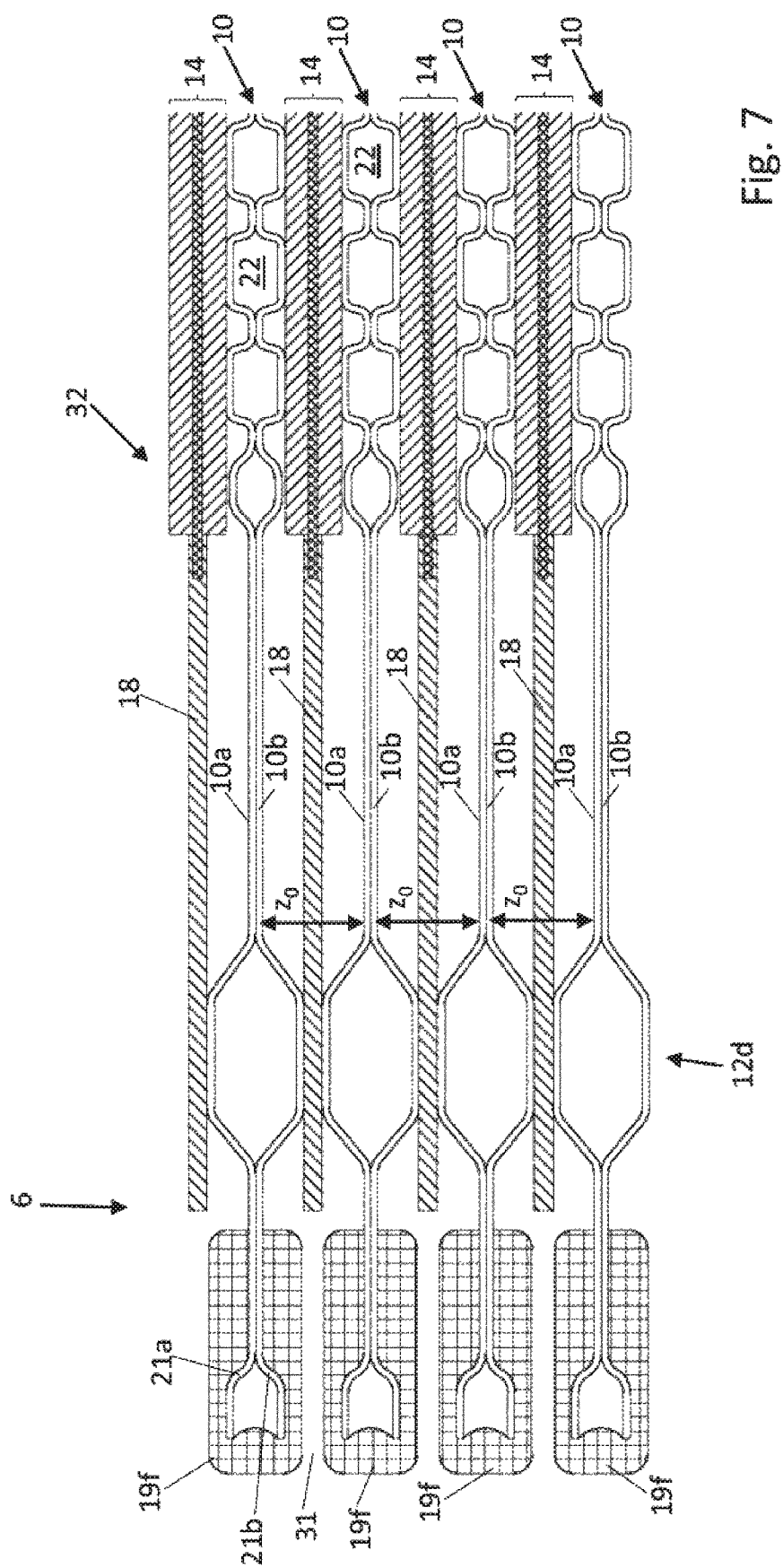
FIG. 7-14 schematically, a detail of an electrochemical system according to the invention with a multitude of electrochemical arrangements, in a sectioned representation and according to different embodiments.

FIG. 7 schematically shows a further embodiment of the stack 32 of the system 1 in a sectioned representation, wherein the section plane is aligned perpendicularly to the plate planes of the separator plates 10. Compared to the previously described embodiments, the stack 32 according to FIG. 7 is characterised by support elements 19f which along the section plane or perpendicular to the direction in which the perimeter beads 12d run comprise an approximately U-shaped cross section and e.g. are stuck onto the separator plates 10 at the edge of the separator plates 10. The support elements 19f can therefore each be positively connected to the separator plates 10, in particular via the half-beads 21a, 21b. Additionally or alternatively, the support elements 19f can be bonded to the separator plates 10 or be connected to them in another manner. The support elements 19f are each arranged on both sides of the separator plates 10 along the z-direction 6 and enclose these, so that they are each in contact with both end plates 10a, 10b of the separator plates 10. An intermediate space 31 whose height corresponds essentially to the thickness of the frame 18 is present between adjacent support elements 19f.

Parallel to the plate planes of the separator plates 10, the support elements 19f do not reach up to the frame 18 which is sealingly received between the perimeter beads 12d of adjacent separator plate 10. Hence the support elements 19f and the frames 18 do not overlap in the z-direction 6. The support elements 19f can be dimensioned in a manner such that given a plate distance $z_0$ in normal operation they reach on both sides of the separator plate 10 on which they are arranged, along the z-direction 6 at least up to the plane, in which the roof of the perimeters beads 12d of the individual plates 10a, 10b of this separator plate 10 extends.

Furthermore, the support elements 19f along the z-direction 6 are dimensioned in a manner such that given a plate distance $z_0$ in normal operation, an intermediate space remains between adjacent support elements 19f along the z-direction 6, so that adjacent support elements 19f do not touch one another given a plate distance of $z_0$. E.g. the support elements 19f are designed in a manner such that adjacent support elements 19f contact one another for the first time when the plate distance of adjacent separator plates 10 is reduced to a value $z_1<z_0$ as a result of a pressing of the stack 32. If adjacent separator plates 10 lie at different electrical potentials on operation (such as e.g. with a fuel cell stack), then it is necessary for the support elements 19f not to be electrically conductive at least in those regions on their surface, along which they could get into contact with one another as a result of a pressing of the stack 32, in order to prevent an electrical contact from occurring between adjacent separator plates 10 via the support elements 19f (electrical short circuit). E.g. the support elements 19f can each be coated with an electrically insulating layer. Alternatively, the support elements 19f or some of them can also each be formed entirely of electrically insulating material.

Figure 8:
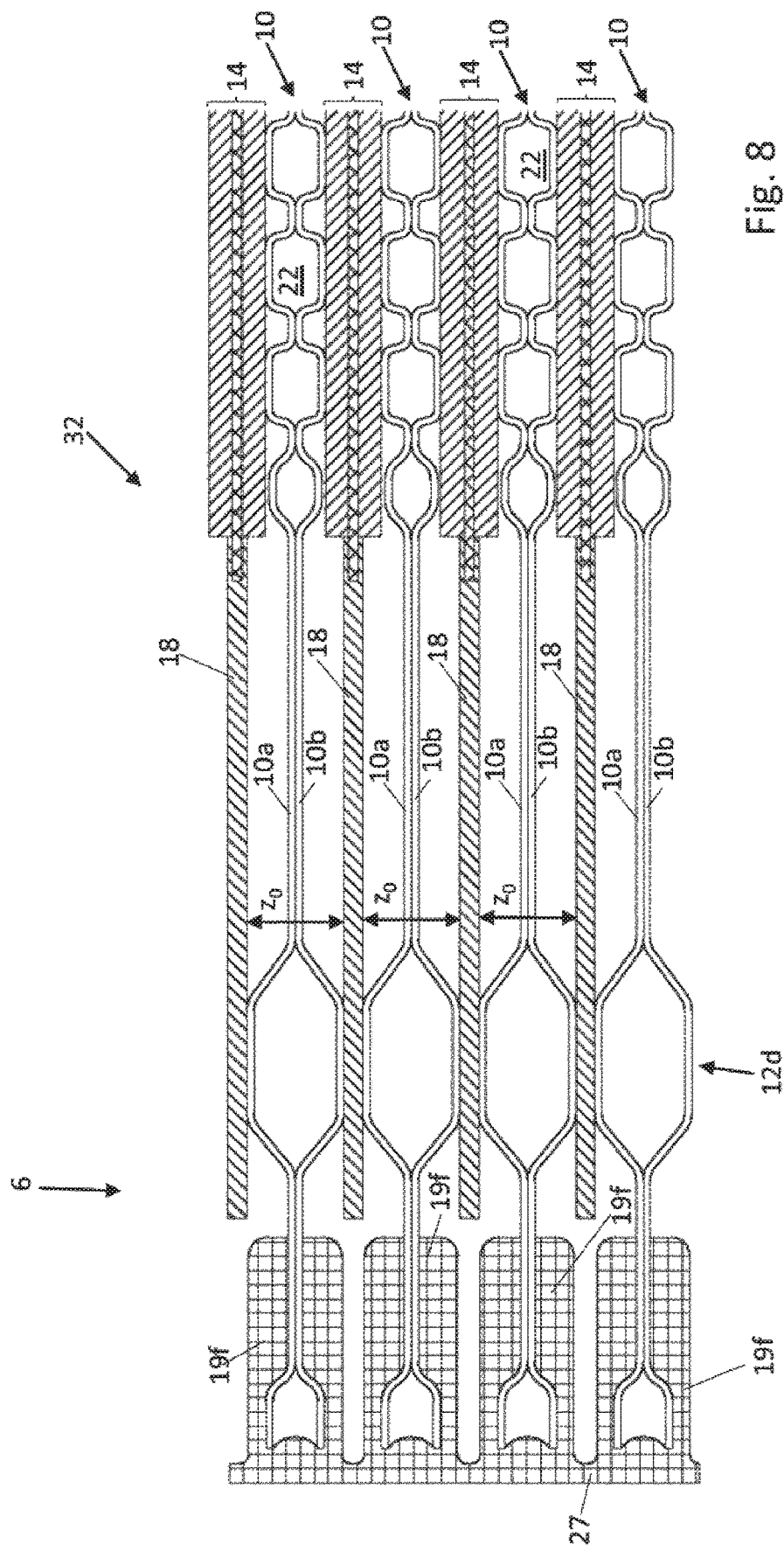

FIG. 8 schematically shows a further embodiment of the stack 32 of the system 1 in a sectioned representation, wherein the section plane is aligned perpendicularly to the plate planes of the separator plates 10. The embodiment according to FIG. 8 differs from the embodiment according to FIG. 7 in that the support elements 19f are each connected to a holding element 27. The support elements 19f are therefore connected to one another along the z-direction 6 via the holding element 27. The holding element 27 extends at the edge of the stack 32 along the z-direction 6 over a multitude of separator plates 10. The modulus of elasticity of the material from which the holding element is formed can be roughly as large as the modulus of elasticity of the material from which the support elements 19f are formed. Concerning the embodiment which is shown in FIG. 8, the support elements 19f and the holding element 27 are manufactured from the same material and are designed as one piece. The holding element 27 typically increases the resistance of the stack 32 to a pressing of the stack 32 in the z-direction 6 at least in the edge region of the stack 32, wherein given a high pressing, the holding element 27 can yield at least partly in the direction which is away from the plate interior.

Figure 9:
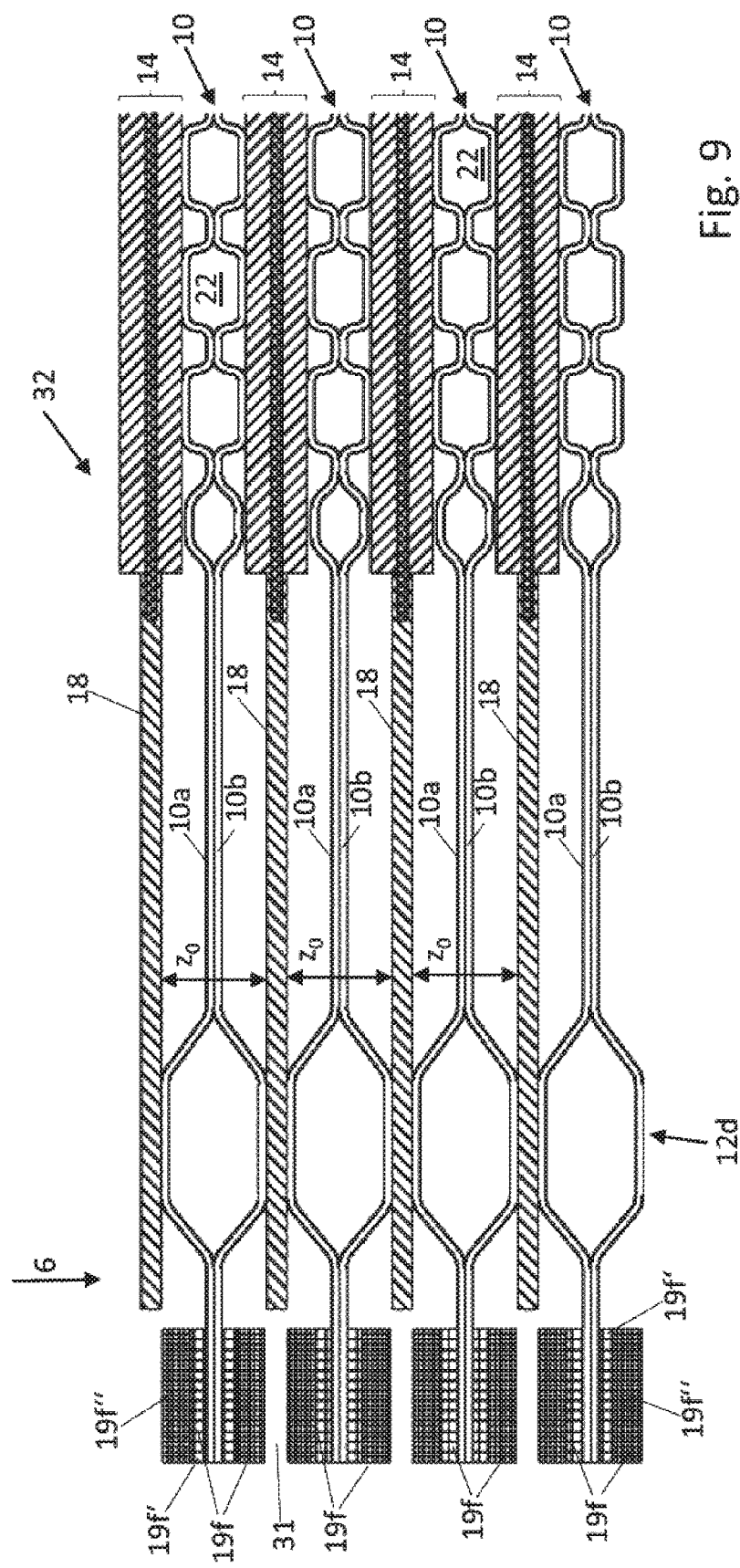

FIG. 9 schematically shows a further embodiment of the stack 32 of the system 1 in a sectioned representation, wherein the section plane is aligned perpendicularly to the plate planes of the separator plates 10. The embodiment according to FIG. 9 differs from the embodiment according to FIG. 7 on the one hand in that no half-bead is present on the left outer edge of the separator plates. On the other hand, it differs from that according to FIG. 7 in that the support elements 19f are each composed of two different materials 19f and 19f' which opposes a pressing along the z-direction 6 e.g. with a differently large resistance. E.g. at least one of the materials 19f, 19f' can be foamed and comprise pores which correspond to the pores 23 of the support element 19 according to the FIGS. 4-c. It can also be the case of two otherwise identical materials which have different pore content. The support elements 19f can be for example co-extruded.

The materials 19f, 19f' form layers which are aligned parallel to the plate planes of the separator plates 10 and which with the separator plates 10 each from a sandwich-like structure which is mirror-symmetrical with respect to the plate plane of the respective separator plate 10. Herein, the separator plate 10 forms the innermost layer of this structure. The first material 19f of the support element 19f forms the second layer which is in contact with the separator plate 10 on both sides of the separator plate 10. And the second material 19f''' of the support element 19f forms the third layer which is in contact with the second layer on both sides of the separator plate 10.

If, concerning the embodiment according to FIG. 9, adjacent support elements 19f come into contact for the first time as a result of a pressing of the stack 32 along the z-direction 6 after closing the intermediate space 31, then the resistance of the support elements 19f to a further pressing is e.g. firstly determined by that one of the materials 19f', 19f''' which has a greater elasticity (i.e. a smaller modulus of elasticity). The course of the force-displacement characteristic line $F_S(z)$ of the support elements 19f can also be influenced or adjusted in a targeted manner by way of such a construction of the support elements 19f of two different materials 19f', 19f'''. E.g. the course of $F_S(z)$ can be adjusted in this manner such that $F_S(z)$ runs in a flat manner for all plate distances z of $z_1 < z < z_0$ and that $F_S(z)$ runs steeply or the like for plate distances z of $z < z_1$ (cf. FIG. 4d).

Figure 10:
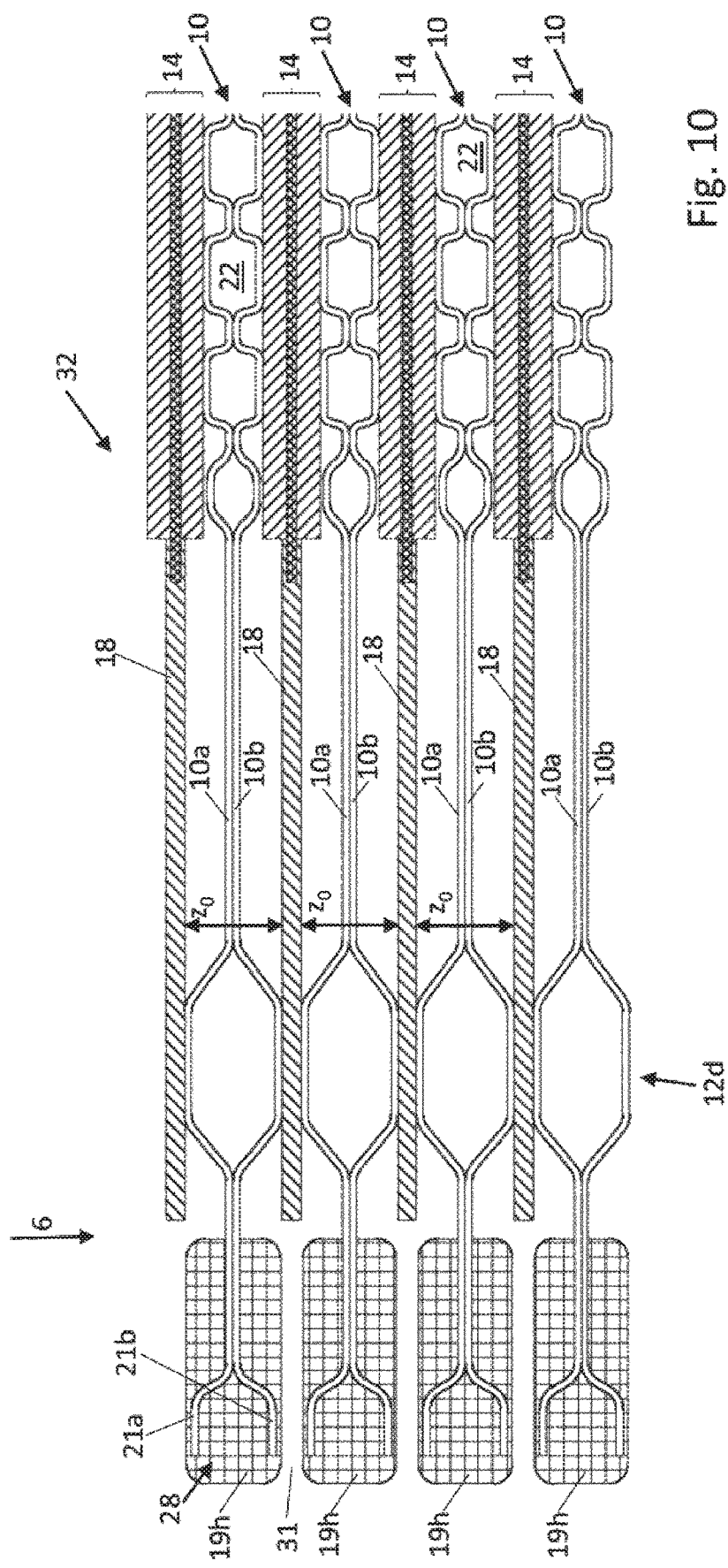

FIG. 10 schematically shows a further embodiment of the stack 32 of the system 1 in a section representation, wherein the section plane is aligned perpendicularly to the plate planes of the separator plates 10. The embodiment according to FIG. 10 differs from the embodiment according to FIG. 7 in that the support elements 19h according to FIG. 10 each fill out an intermediate space 28 which is formed by the half-beads 21a, 21b on the edge of the individual plates 10a, 10b. The stability of the half beads 21a, 21b and of the support elements 19h can therefore be further increased.

Figure 11:
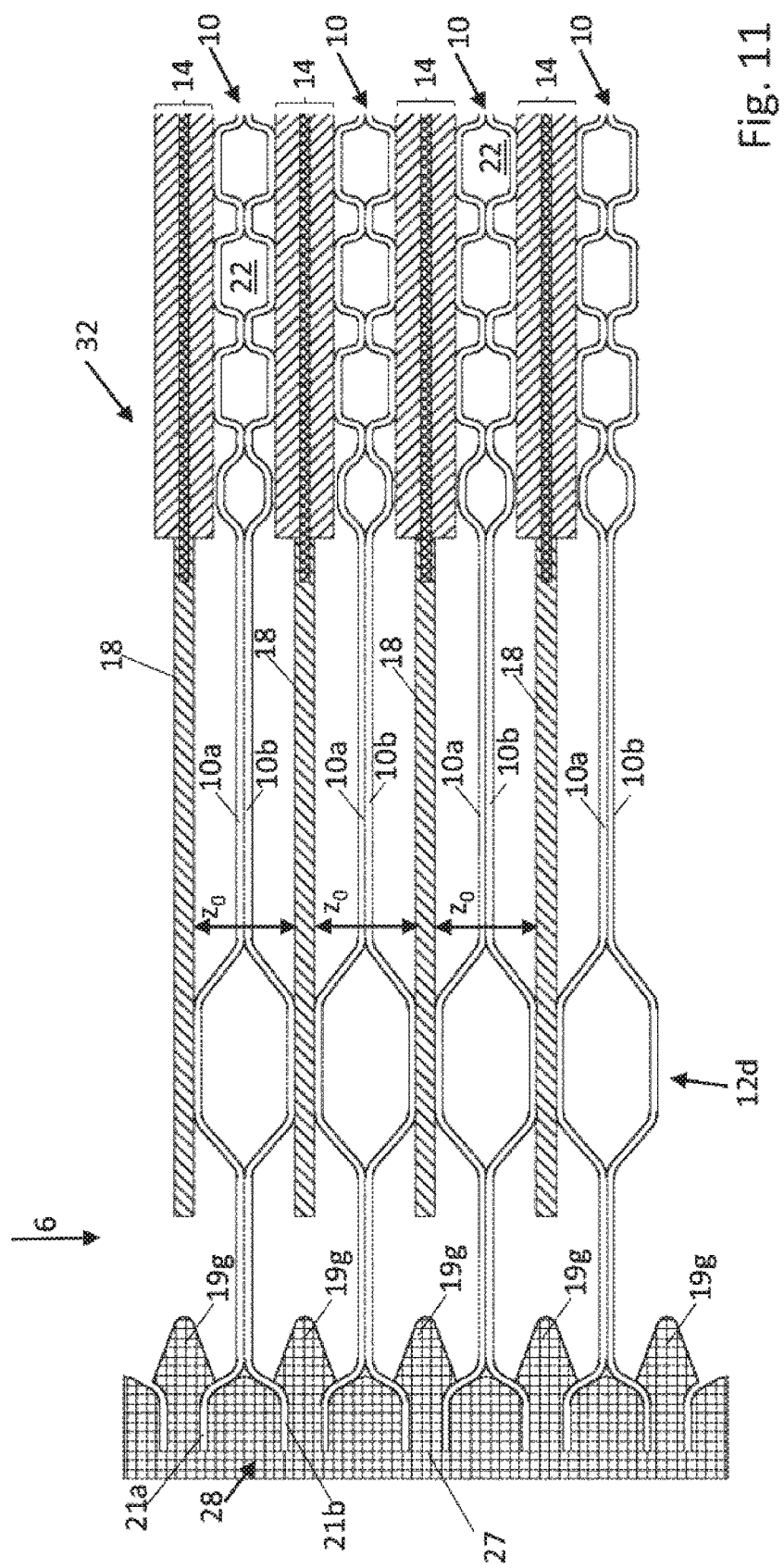

FIG. 11 schematically shows a further embodiment of the stack 32 of the system 1 in a sectioned representation, wherein the section plane is aligned perpendicularly to the plate planes of the separator plates 10. The embodiment according to FIG. 11 is a variant of the embodiment according to FIG. 8. In FIG. 11 the support elements 19g are each arranged in the edge region of the separator plates 10 along the z-direction 6 between the half-beads 21a, 21b of adjacent separator plates 10. In particular, the support elements 19g are arranged between the separator plates 10 in a manner such that already with a plate distance $z_0$ in normal operation they reach along the z-direction 6 up to two adjacent separator plates 10 and contact these. Likewise, the support elements 19g each fill the intermediate cavity 28 between the half-beads 21a, 21b. Furthermore, the support elements 19g are each connected to an integral holding element 27 which extends along the z-direction 6 at the edge of the stack 32 over a multitude of separator plates 10. In FIG. 11, the support elements 19g and the holding element 27 are manufactured of the same material and are designed in a single-part manner.

Figure 12:
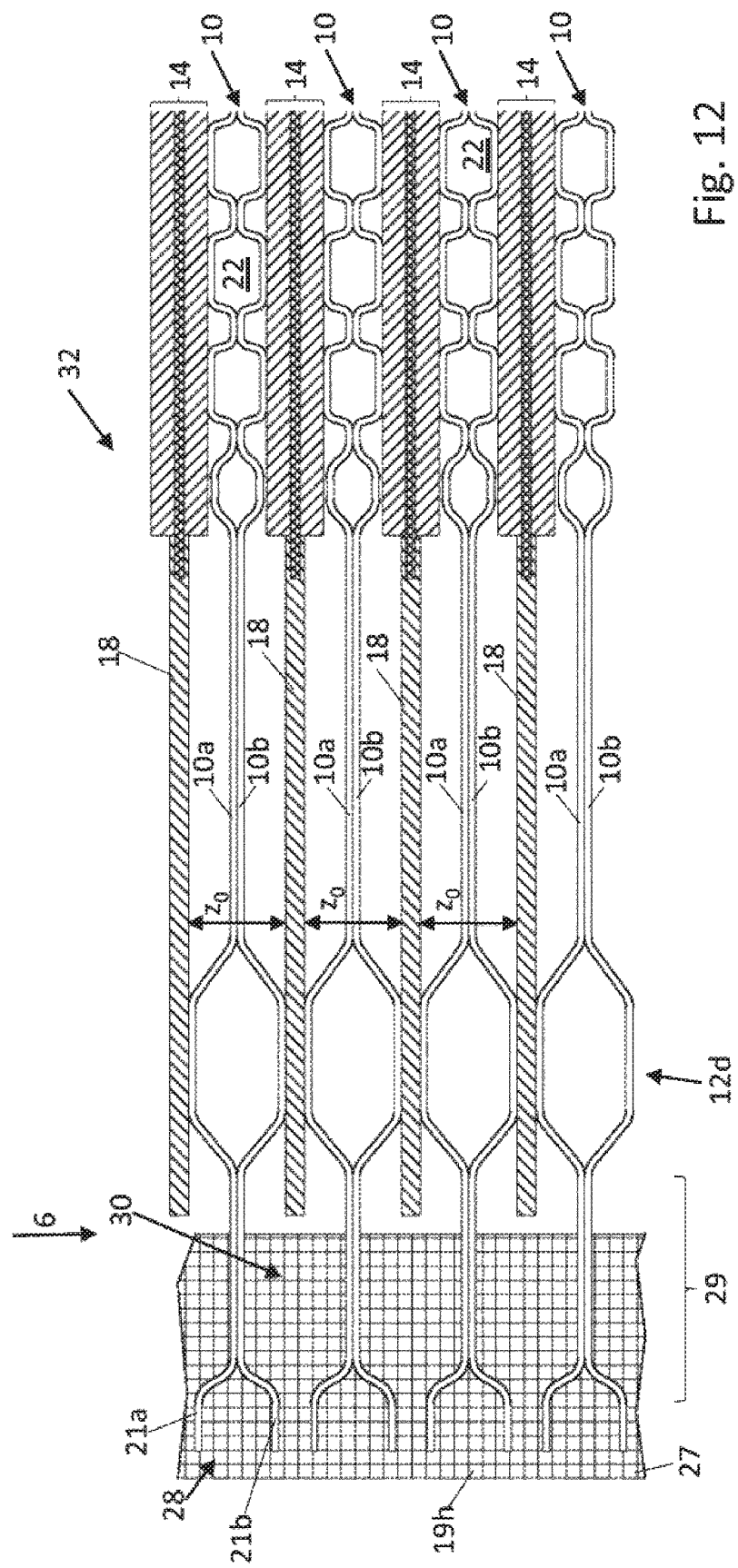

FIG. 12 schematically shows a further embodiment of the stack 32 of the system 1 in a sectioned representation, wherein the section plane is aligned perpendicularly to the plate planes of the separator plates 10. The embodiment according to FIG. 12 differs from the embodiment according to FIG. 11 in that the support elements 19h according to FIG. 12 extend parallel to the plate planes of the separator plates 10 at least partly in a region 29 which reaches from the half beads 21a, 21b at the edge to the separator plates 10 up to the perimeter beads 12d. The support elements 19h herein fill intermediate spaces 30 which are formed along the z-direction 6 in the region 29 between the adjacent separator plates 10, to a complete extent, even at a plate distance $z_0$ in normal operation.

Figure 13:
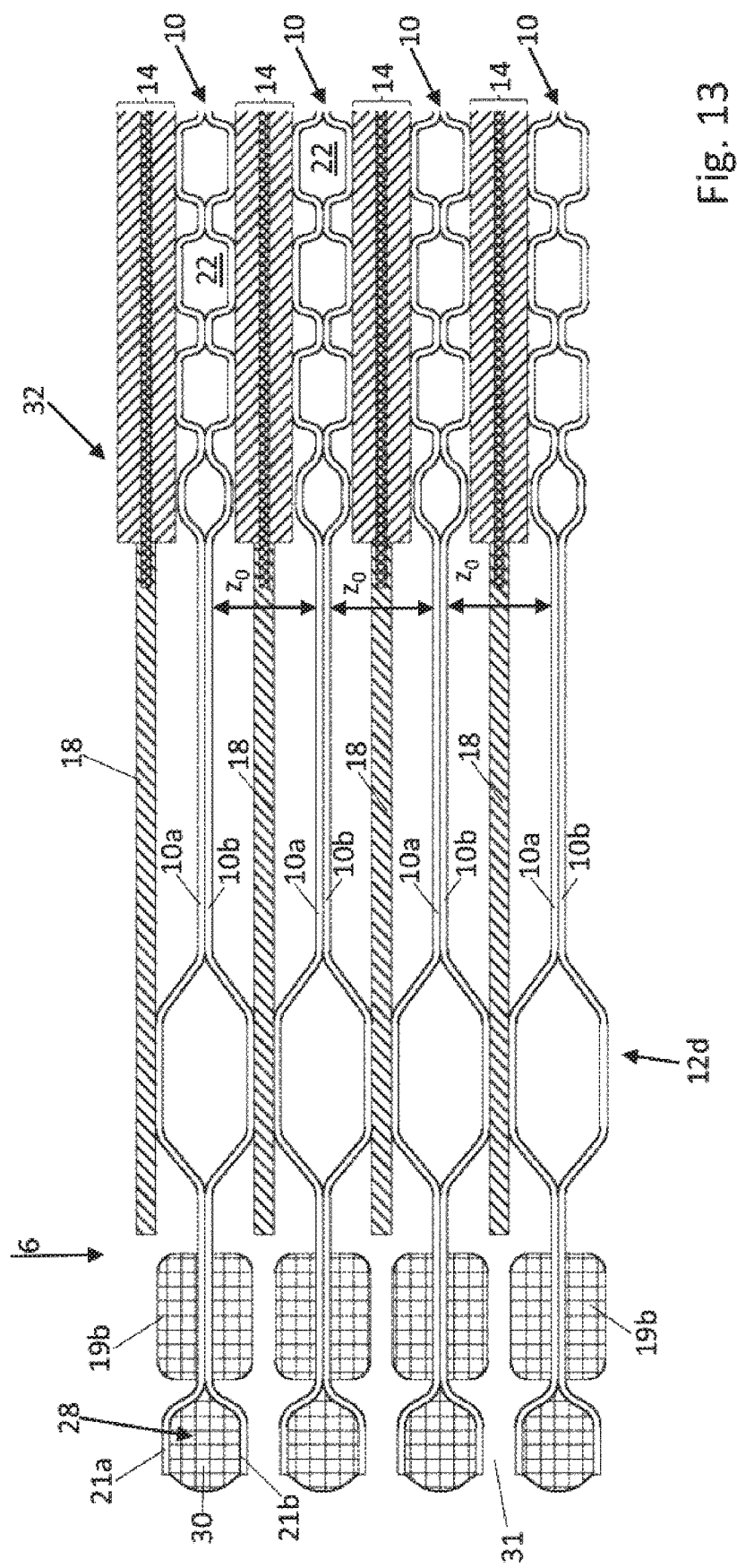

FIG. 13 schematically shows a further embodiment of the stack 32 of the system 1 in a sectioned representation, wherein the section plane is aligned perpendicularly to the plate planes of the separator plates 10. The embodiment according to FIG. 13 differs from the embodiment according to FIG. 3a in that the frames 18 parallel to the plate planes of the separator plates 10 do not extend or hardly extend beyond the perimeters beads 12 toward the edge of the separator plates 10. Given a plate distance $z_0$ in normal operation, intermediate spaces therefore remains between adjacent support elements 19b along the z-direction 6. Furthermore, the embodiment according to FIG. 13 differs from the embodiment according to FIG. 3a by filling elements 30 which completely fill out the intermediate space 28 between the half-beads 21a, 21b of the separator plates 10 and which thus provide the separator plates 10 with additional stability.

Figure 14:
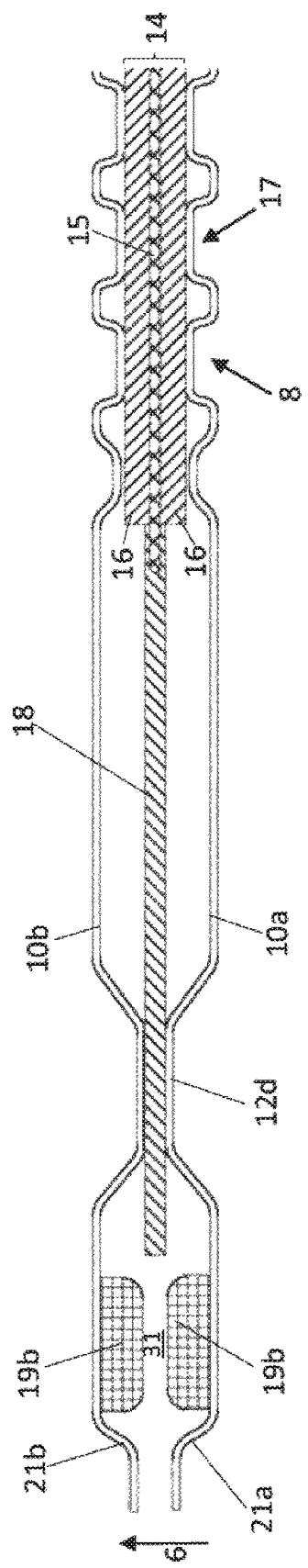

FIG. 14 shows a further embodiment of the stack 32 of the system 1 in a sectioned representation, where here however only one electrochemical cell with two individual plates 10a, 10b which belong to two different separator plates is represented. Here, the support elements 19b are arranged on individual plates $10a$, $10b$ in a region between the perimeter bead $12d$ and the semi-beads $21a$, $21b$ on the edge region of the individual plates $10a$, $10b$. The frame $18$ does not reach into the region, in which the support elements $19b$ are arranged, so that an intermediate space $31$ remains between the non-pressed support elements $19b$.

The invention claimed is:

1. An electrochemical arrangement
with a first and a second metallic separator plate which each define a plate plane and which are stacked in a stack direction perpendicularly to the plate planes;
with an electrochemical cell which is arranged between the separator plates;
wherein the separator plates each comprise at least one sealing element which is embossed into the separator plate and which rises above the respective plate plane;
wherein the sealing elements of the separator plates are supported against one another for sealing at least the electrochemical cell which is arranged between the separator plates;
wherein the sealing elements of the separator plates are elastically deformable in the stack direction, so that a distance z of the plate planes of the separator plates to one another is reversibly reducible at least to a distance $z_2$ by way of an elastic compression of at least one of the sealing elements of the separator plates; and
with at least one support element which is arranged between the separator plates and which is distanced to the sealing elements of the separator plates in a direction parallel to the plate planes of the separator plates;
wherein the sealing elements of the separator plates and the at least one support element for protection of the sealing elements of the separator plates from an irreversible plastic deformation are configured such that when the distance z of the plate planes of the separator plates to one another is reduced to a distance z of $z \leq z_2$ as a result of a pressing force which acts upon the separator plates in the stack direction, a force $F_S$ which is required for compressing or for the further compressing of only the at least one support element by a displacement $\Delta z'$ in the stack direction is larger than a force $F_D$ which is required for the further compressing of only the at least one sealing element of the separator plates by the displacement $\Delta z'$ in the stack direction.

2. The electrochemical arrangement according to claim 1, wherein the sealing elements of the separator plates and wherein the at least one support element are configured such that for $z \leq z_1$ with $z_1 > z_2$, given a further reduction of the distance z of the separator plates to one another the force $F_S$ which is required for compressing or for the further compressing of only the support element by a displacement $\Delta z'''$ in the stack direction grows more rapidly than the force $F_D$ which is required for the further compression of only the sealing element by the displacement $\Delta z'''$ in the stack direction.

3. The electrochemical arrangement according claim 1, wherein the at least one support element is configured in a manner such that it has an essentially exponential force-displacement curve for $z \leq z_1$ with $z_1 > z_2$.

4. The electrochemical arrangement according to claim 1, wherein the sealing elements of the separator plates are configured in a manner such that a reduction of the distance of the separator plates to one another to a value $z \leq z_3$ with $z_3 < z_2$ effects an irreversible plastic compression with regard to at least one of the sealing elements of the separator plates.

5. The electrochemical arrangement according to claim 1, wherein one, more, or each of the support elements of the at least one support element comprises/comprise one or more of at least one cavity and a multitude of pores.

6. The electrochemical arrangement according to claim 5, wherein the sealing elements of the separator plates and wherein the at least one support element are configured such that for z with $z_2 < z_1 < z < z_0$ the force $F_D$ which is required for compressing or for the further compressing of only the at least one sealing element of the separator plates by a displacement $\Delta z''$ in the stack direction is larger or equal to the force $F_S$ which is required for the compressing or for the further compressing of only the at least one support element by the displacement $\Delta z''$ in the stack direction.

7. The electrochemical arrangement according to claim 1, wherein one, more, or each of the support elements of the at least one support element comprises/comprise a foamed material.

8. The electrochemical arrangement according to claim 5, wherein each support element which comprises the one or more of the at least one cavity and the multitude of pores is configured in a manner such that the one or more of the at least one cavity and the multitude of pores is/are completely or at least partly collapsible by way of a pressing force which acts upon the separator plates in the stack direction.

9. The electrochemical arrangement according to claim 8, wherein the support element which comprises the one or more of the at least one cavity and the pores configured in a manner such that one or more of the at least one cavity and the pores is/are each maximally collapsed given a distance of the separator plates to one another of $z \leq z_2$.

10. The electrochemical arrangement according to claim 1, wherein the at least one support element comprises at least one first support element which is arranged in a manner such that at least one intermediate space remains between the separator plates and the at least one first support element in the stack direction for $z > z_1$ with $z_1 > z_2$, wherein the at least one intermediate space becomes zero for $z \leq z_1$.

11. The electrochemical arrangement according to claim 1, wherein the sealing elements of the separator plates each comprise a perimeter bead which encloses the electrochemical cell and seals it with respect to an environment of the electrochemical arrangement.

12. The electrochemical arrangement according to claim 11, wherein the at least one support element comprises at least one second support element which in a direction parallel to the plate planes of the separator plates is arranged on a side of the perimeter bead which is away from the electrochemical cell.

13. The electrochemical arrangement according to claim 1, wherein each support element of the at least one support element at least in regions comprises an electrically insulating material or at least in regions is formed at least in part of an electrically insulating material, wherein the electrically insulating material of each support element of the at least one support element is arranged in a manner such that at each distance z of the metallic separator plates to one another, no electrical contact between the metallic separator plates can be created via this support element.

14. The electrochemical arrangement according to claim 1, wherein one, more or each of the support elements of the at least one support element comprises/comprise one or more of a thermoplastic material, a thermoplastic elastomer, a ceramic material a polymer-based support fabric, and a metallic support fabric.

15. The electrochemical arrangement according to claim 1, wherein one, more or each of the support elements of the at least one support element is/are one or more of materially connected to at least one of the separator plates, positively connected to at least one of the separator plates, non-positively connected to at least one of the separator plates, materially connected to a frame of the electrochemical cell, and positively connected to the frame of the electrochemical cell.

16. The electrochemical arrangement according to claim 1, wherein one, more, or each of the support elements of the at least one support element is/are configured in a manner such that it/they is/are stuck, onto at least one of the separator plates in a direction parallel to the plate planes of the separator plates.

17. The electrochemical arrangement according to claim 1, wherein each of the separator plates comprises two metallic individual plates which for forming this separator plate are materially connected to one another, wherein each of the individual plates comprises at least one sealing element which is embossed into these individual plates and which is elastic in the stack direction.

18. An electrochemical system, comprising an electrochemical arrangement with a first and a second metallic separator plate which each define a plate plane and which are stacked in a stack direction perpendicularly to the plate planes;
    with an electrochemical cell which is arranged between the separator plates;
    wherein the separator plates each comprise at least one sealing element which is embossed into the separator plate and which rises above the respective plate plane;
    wherein the sealing elements of the separator plates are supported against one another for sealing at least the electrochemical cell which is arranged between the separator plates;
    wherein the sealing elements of the separator plates are elastically deformable in the stack direction, so that a distance z of the plate planes of the separator plates to one another is reversibly reducible at least to a distance $z_2$ by way of an elastic compression of at least one of the sealing elements of the separator plates;
    with at least one support element which is arranged between the separator plates and which is distanced to the sealing elements of the separator plates in a direction parallel to the plate planes of the separator plates;
    wherein the sealing elements of the separator plates and wherein the at least one support element for protection of the sealing elements of the separator plates from an irreversible plastic deformation are configured such that when the distance z of the plate planes of the separator plates to one another is reduced to a distance z of $z \leq z_2$ as a result of a pressing force which acts upon the separator plates in the stack direction, a force $F_S$ which is required for compressing or for the further compressing of only the at least one support element by a displacement $\Delta z'$ in the stack direction is larger than a force $F_D$ which is required for the further compressing of only the at least one sealing element of the separator plates by the displacement $\Delta z'$ in the stack direction; and
    with a holding element which is arranged laterally on the stack, wherein the at least one support element comprises a multitude of support elements which are connected to the holding element or are configured as one part with the holding element, wherein the holding element extends in a common stack direction over a multitude of electrochemical arrangements.

19. The electrochemical arrangement according to claim 16, wherein being stuck onto at least one of the separator plates in a direction parallel to the plate planes of the separator plates includes being releasably stuck.

20. The electrochemical arrangement according to claim 1, wherein the separator plates each comprise at least one through-opening for leading a medium through the separator plate, wherein the at least one sealing element of the separator plates comprises a port bead which is embossed into the respective separator plate and which is arranged peripherally around the at least one through-opening of this separator plate and wherein one, more or each of the support elements of the at least one support element is/are arranged on a side of the port bead which is away from the at least one through-opening, wherein the at least one support element is distanced to the port bead within a plane which runs parallel to the plate planes of the separator plates.

* * * * *